United States Patent [19]

Konheim

[11] 4,264,782
[45] Apr. 28, 1981

[54] METHOD AND APPARATUS FOR TRANSACTION AND IDENTITY VERIFICATION

[75] Inventor: Alan G. Konheim, Yorktown Heights, N.Y.

[73] Assignee: International Business Machines Corporation, Armonk, N.Y.

[21] Appl. No.: 53,589

[22] Filed: Jun. 29, 1979

[51] Int. Cl.³ .............................................. H04L 9/00
[52] U.S. Cl. ................................ 178/22; 340/149 R; 364/200
[58] Field of Search ......... 178/22; 340/149 R, 149 A, 340/152 R; 375/2; 364/200

[56] References Cited

U.S. PATENT DOCUMENTS

| 4,123,747 | 10/1978 | Lancto et al. | 178/22 |
| 4,182,933 | 1/1980 | Rosenblum | 178/22 |
| 4,186,871 | 2/1980 | Anderson et al. | 178/22 |

OTHER PUBLICATIONS

"Design and Specification of Cryptographic Capabilities", Campbell, Jr., *Preprint for Conference on Computer Security and the Data Encryption Standard*, Feb. 15, 1977.

Primary Examiner—Howard A. Birmiel
Attorney, Agent, or Firm—Roy R. Schlemmer, Jr.

[57] ABSTRACT

A method and apparatus whereby the senders and receivers of messages sent over a transmission system including a Host CPU may guarantee the integrity of the data content of the message and also the absolute identity of the sender. Each user of the system as well as the Host CPU contains an identical key-controlled block-cipher cryptographic device with data chaining for encrypting and decrypting messages as required, wherein each user has knowledge of only his own cryptographic key and wherein the Host CPU has access to the unique cryptographic keys of all users of the system stored in a high security storage area available only to said CPU. Stated very generally, the originator of a message A sends a message to a receiver B which includes a transaction or message portion X and a unique digital signature portion Y which is a function both of the message and the senders unique cryptographic key $K_A$. The receiver then communicates with the CPU for verification of the signature Y. The CPU accesses the sender's key $K_A$ from a secure memory and computes the digital signature Y utilizing the message portion X received from B and the key $K_A$. Upon a successful verification of the signatures by the CPU, the CPU notifies B via an additional message that the signature of A is valid based on the data content of the message and the key $K_A$. Based on the information received from the CPU, B may be certain that the signature and message originated with A and A may not later deny having sent the message as it would be virtually impossible for the signature to be forged since it is a complex function of the message content itself. A may also be assured that B cannot alter the message as the signature would no longer be valid.

According to other aspects of the invention the interrupting of communications between A and B by an eavesdropper and the subsequent sending of stale messages is prevented. As a still further feature of the invention, an eavesdropper is prevented from sending the "forged" approval from the CPU to the receiver B.

17 Claims, 16 Drawing Figures

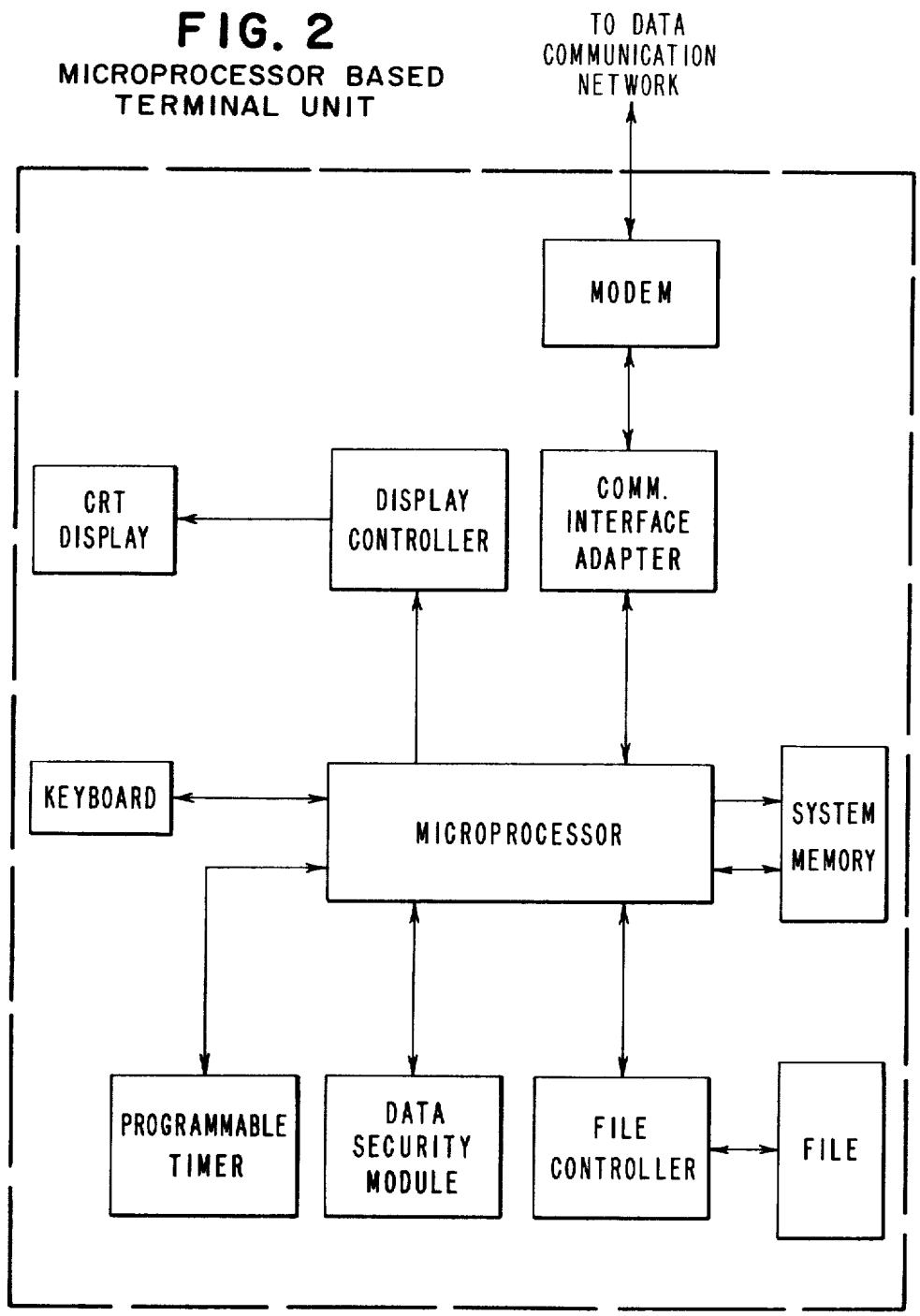

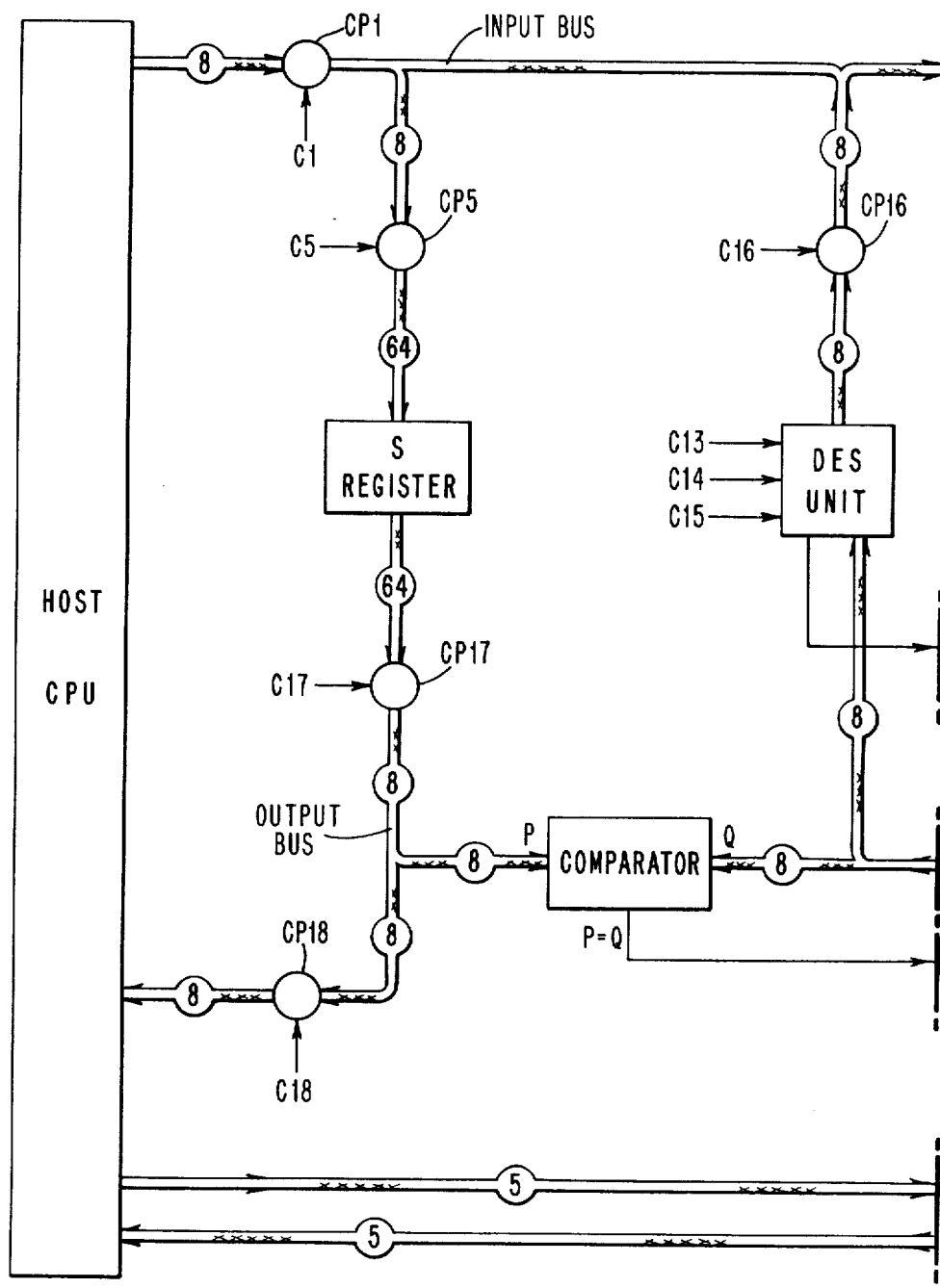

VERIFY UNIT
CONTROLLER

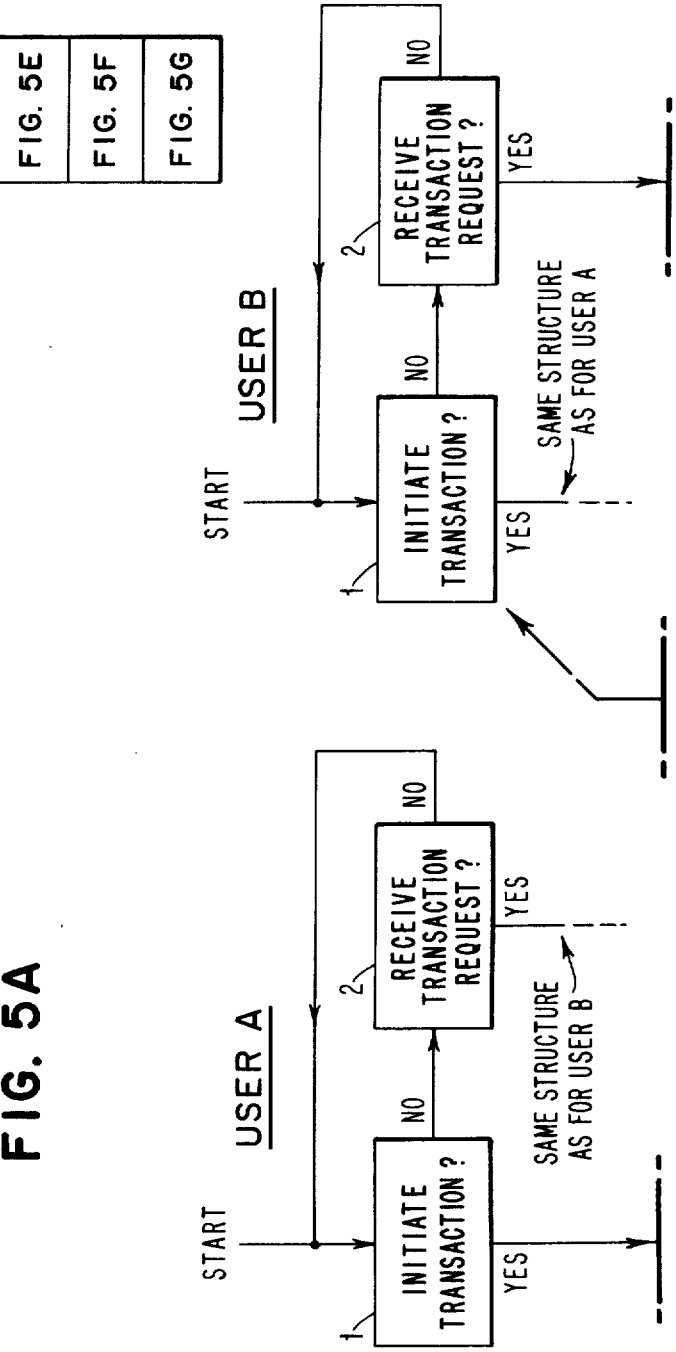

METHOD AND APPARATUS FOR TRANSACTION AND IDENTITY VERIFICATION

DESCRIPTION

1. Technical Field

The present invention relates to a high security communication system including a plurality of users or terminals connected to each other via a common communication link which is in turn connected to a Host CPU. By means of the present system it is possible for a sender A to communicate a specific transaction to a user B with an extremely high degree of integrity or confidence in the transaction. Utilizing the present system the following threats to transaction integrity may be substantially eliminated.

The first threat is reneging, wherein the sender engages in a transaction with a receiver sending data which he may subsequently attempt to disown. Thus, the receiver must know with certainty that the sender sent the specific message which fact may be proven subsequently.

A second possible threat to such a system is forgery, wherein the receiver may allege that he received a message from a given sender, which message is a fabrication, thus, it must be possible for the sender to prove that the supposed message was in fact a forgery.

A third threat is similar to forgery namely that of alteration, wherein the receiver might alter the message in a material way which would do some financial or other harm to the alleged sender. Thus, any alteration of such a message must be identifiable by the alleged sender.

A still further threat is where a sender or other person by penetrating the communication system would attempt to fool a receiver into accepting a transaction as valid from some sender by manipulation of the operating system, such as by eavesdropping and the capture and resending of stale messages or the fabrication of "approval" signals from the CPU, etc. The system must thereby guarantee B that such penetration is not possible. A final threat is masquerading, wherein a user on the system would attempt to masquerade as a different user to a third party. This would normally be done by means of a combination of the above threats.

It must be assumed that all users are linked to the host telecommunication system in common and that their messages are enciphered by a common encipherment process. Accordingly, the integrity of the communication's security, or lack of it, will play no role in the verification of transactions.

There are many potential uses for such a system in the modern business community. Potential applications are in the area of stock market transactions carried out over the communications systems, automatic banking transactions, electronic mail and/or any other system in which digitalized messages are sent and received over public communications channels and wherein the integrity of both the messages and the originators must be absolutely guaranteed.

It is accordingly a primary object of the present invention to provide such a high security communication system wherein both the transaction content and the signatures of senders may be completely verified and wherein all of the above enumerated threats may be substantially eliminated.

It is a further object to provide such a system utilizing readily available communications and computational hardware organized and operated in the manner set forth herein to produce such a system.

Other objects, features and advantages of the system will be apparent from the subsequent description of the system and claims.

2. Background Art

The following publications all relate to various types of electronic or digital signature systems generally using various types of approaches to achieve data and/or message integrity. The systems disclosed in these publications differ considerably in both approach and results to the system disclosed herein. (1) M. O. Rabin, "Signature and Certification by Coding," IBM Technical Disclosure Bulletin, Vol. 20, No. 8, pp. 3337-8, (January 1978). (2) W. Diffie, M. Hellman, "New Directions in Cryptography," IEEE Trans. on Information Theory (November 1976). (3) R. L. Rivest, A. Shamir and L. Adleman, "On Digital Signatures and Public-Key Crypto-Systems," M.I.T. Laboratory for Computer Science Report, MIT/LCS/TM-82 (April 1977).

BRIEF DESCRIPTION OF THE DRAWINGS

FIG. 2 comprises a functional block diagram of a preferred embodiment of one of the terminal blocks illustrated in FIG. 1.

FIG. 3 comprises an organizational drawing for FIGS. 3A and 3B.

FIGS. 3A and 3B comprise a functional block diagram of the Verify Unit block attached to the Host CPU block shown in FIG. 1.

FIGS. 4A and 4B comprise a detailed functional block diagram of the Verify Unit Controller block shown in FIG. 3B.

FIG. 5 comprises an organizational drawing for FIGS. 5A through 5G.

FIGS. 5A through 5G comprise a detailed operational flow chart illustrating the operation of the herein disclosed high security communications system.

DISCLOSURE OF INVENTION

Figure 1:
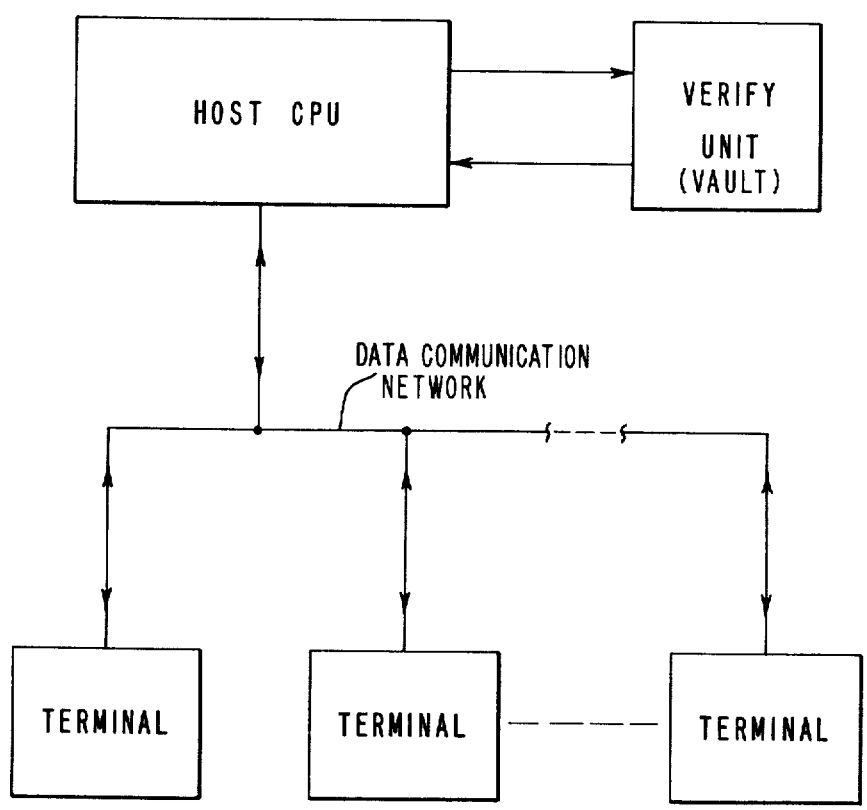
FIG. 1 comprises an overall block diagram of the high security communication system of the present invention.

For a better comprehension of the invention there will follow a general discussion of the underlying principles, first of a general transaction and identity verfication system, and then, a discussion of the broad application of these principles to the presently disclosed system. Finally there will follow a detailed description of the presently disclosed hardware which constitutes the best mode configuration.

As stated generally above, a transaction verification system having a high degree of integrity or security must incorporate a number of particular features. Suppose a User A (the originator of the transaction) wishes to send a data block D to a User B (the recipient of the transaction), the architectural requirements of the transaction verification system and the protocols which said system must follow must include the following features. The User A must provide with the message D some information, which is referred to herein as the signature (S), which signature must be dependent both on the data and the particular user. The system must be such that a valid signature S based on data D by User A must be essentially impossible for User B to construct. Similarly, no other person having access to the system should be able to construct said signature. Further, the system must include a mechanism whereby the User B can verify that S is a proper signature for the data D by the User A. The system must also provide a mechanism whereby the data content of a message validly received by B cannot subsequently be denied by the originator A. Further, the verification process must be uneffected by penetration of the operating system. Finally, the verification process must have some time dependence to prevent the reuse of stale messages obtained validly by, for example, the recipient B, or by some third party eavesdropping on the system.

The following describes a system architecture and protocol which accomplishes the above enumerated features.

It should first be understood that the present system utilizes a key-controlled block-cipher cryptographic system referred to hereinafter as DES and in the formulas and drawings by the symbol $\pi$. A preferred embodiment of such an encryption device is that set forth in the National Bureau of Standards Federal Information processing standard entitled, "Encryption Algorithm for Computer Data Protection." The standard together with a complete technical description is contained in the publication, "Data Encryption Standard," Federal Information Processing Standard (FIPS), Publication 46, National Bureau of Standards, U.S. Department of Commerce (January 1977). While other key-controlled block-cipher cryptographic systems could be utilized in the invention, the above-referenced system is preferred.

Further, the particular cryptographic system used must incorporate data chaining. Chaining is introduced to make each bit of the signature S functionally dependent upon each bit of the data. For the description of such a block-chaining system, reference is made to U.S. Pat. No. 4,078,152 of L. B. Tuckerman entitled, "Block-Cipher Cryptographic System with Chaining."

The encryption algorithm or the operation performed by the $\pi$ block utilized in the present embodiment performs an operation represented by the formula:

$$\text{cleartext } D \rightarrow \pi(K,D) \text{ ciphertext}$$

This denotes the encipherment of the (cleartext) data D (of a fixed length of at least 8 bytes) by the DES encryption system using chaining with the key K. In the following description the subscript A in ($K_A$) denotes the particular private key of the User A. The inverse operation or decipherment ($\pi^{-1}$) is denoted by the following formula:

$$\text{ciphertext } \pi(K,D) \leftarrow \pi^{-1}(K,\pi(K,D)) = D \text{ cleartext}$$

The following description is essentially a description of the protocol involved or method by which the present invention is realized. For purposes of this description FIG. 1 may be referred to. It will be noted that the overall system shows a number of terminals or users connected over a data communication network to a Host CPU. It will further be noted that the Host CPU is partitioned into the Host and a Verify Unit which is a high security device accessible only to the operating system and high security personnel who would be authorized to handle the various User Keys $K_X$ as well as the master Verify Unit key which will be denoted subsequently as $K_{HV}$.

At the system initialization time, the Host operating system enciphers each user key according to the following formula:

$$K_A \leftarrow \pi(K_{HV},K_A) = K_A^*$$

In the above formula symbol $K_A$ refers to User A's personal key and $K_{HV}$ is the Verify Unit master key as indicated above. The result of all computations are stored in the regular Host CPU's memory in the following format:

| A | $\leftarrow$ | $\rightarrow$ | $K_A^*$ |
|---|---|---|---|
| B | $\leftarrow$ | $\rightarrow$ | $K_B^*$ |
| . | | | |
| . | | | |
| Z | $\leftarrow$ | $\rightarrow$ | $K_Z^*$ |

*TABLE

In the above * Table and in the system it is assumed that an address into the * Table may be derived from the User's ID, i.e. A through Z.

In the present system it is assumed that the signature for data D by any User A which is denoted by the symbol $S(K_A,D)$ is the final 8 bytes of the encipherment of the message D by the DES encryption system using chaining with the key $K_A$. As will be apparent later, the data D is a composite of a number of different items including both user ID's, the date, both user time stamps and the message in a predetermined format which will be set forth more fully subsequently.

There will now follow a description of the transaction protocol. It is assumed that each terminal is fitted with a DES encipherment box. Also, each terminal has a programmable timer or "clock" which continuously increments for at least a 24 hour period.

Figure 3B:
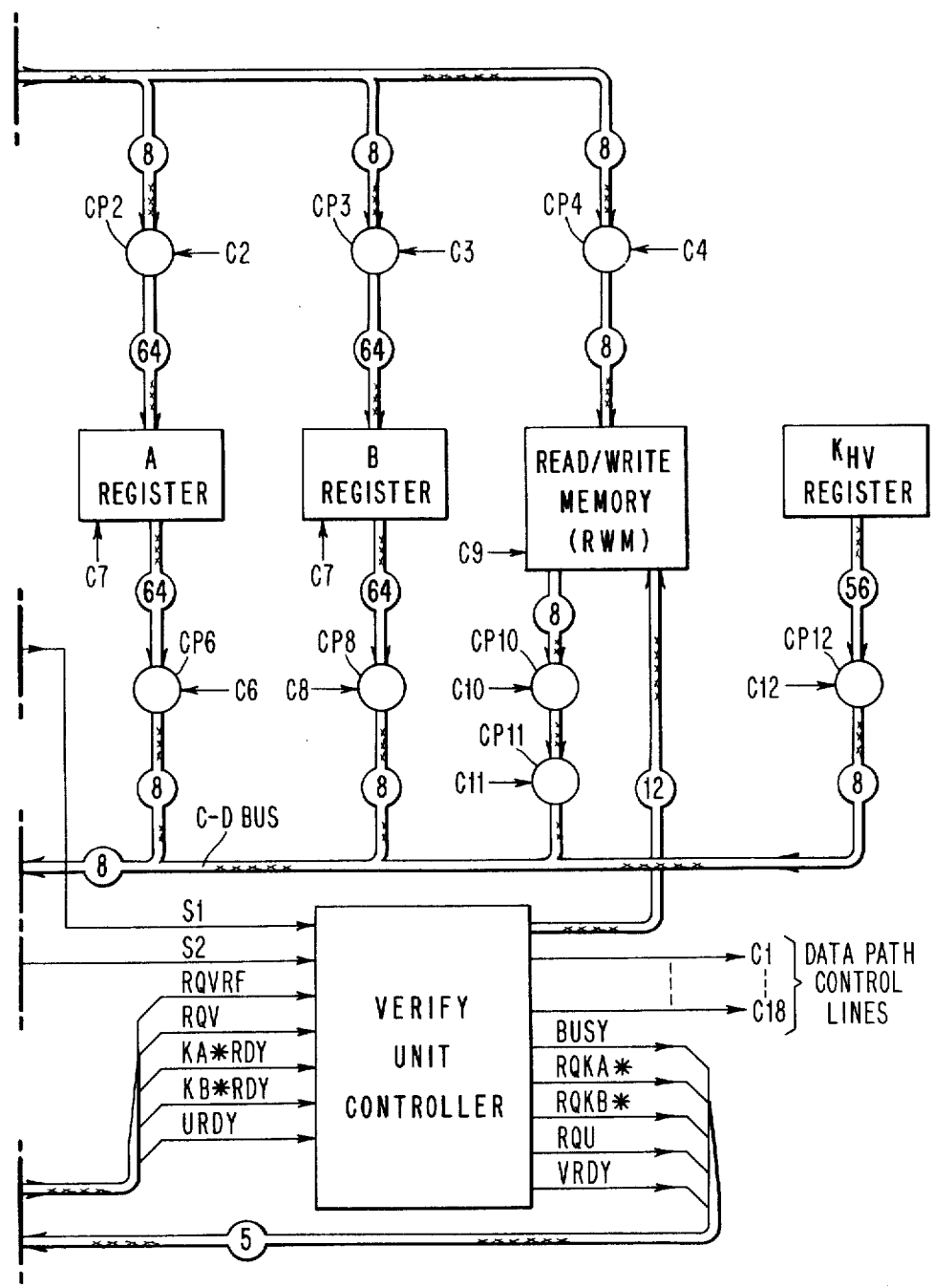

The verification device which is denoted herein as the Verify Unit is located in the Host CPU and is equipped with the specific functional units shown in FIGS. 3A and 3B which consist essentially of a number of special registers for holding signatures and user keys, as well as a DES encipherment box.

A transaction from User A (the originator) to User B (the recipient) proceeds in the following manner. It should first be noted, however, that the following description of the transaction presumes the existence of the above-referenced data stamp mechanisms, counters, etc. A much less secure system could be built without the re-use of same, however, the use of previously verified or stale messages would be impossible to detect without these features. Proceeding now with a description of a typical transaction.

(i) User A and User B establish a link upon the request of User A and User B supplies to User A the current counter value $CT_{rec}$ at user B's terminal. At the same time User B stores this counter value at his own terminal for later checking.

(ii) User A constructs a valid signature represented as follows:

$$S(K_A,D)$$

wherein the data D is defined by the following formula:
 $D \leftarrow$ "User A to User B on Feb. 28, 1977, $CT_{ori}$, $CT_{rec}$—Buy 100 shares of . . . " Upon completion of the generation of the signature S, A sends the pair:

$$(D,S(K_A,D))$$

to User B.

As implied by the definition of the data value D, the actual message data is prefixed by the sequence of parameter values which are the identity of the originator and the recipient of the transaction, i.e., A and B; the date of the transaction, i.e., Feb. 2, 1977; the current counter value $CT_{ori}$ at User A's terminal and the received counter value $CT_{rec}$ from User B's terminal.

In the following description for ease of reference, the message pair which A sends to B denoted by the above formula $(D,S(K_A,D))$ will be referred to subsequently as the message pair (X,Y). In this pair value X corresponds to the data message D as defined above, and the value Y corresponds to the Signature $S(K_A,D)$.

Proceeding now with the description of the protocol, the User B receives a pair (X,Y) which is presumptively equal to the previous message $(D,S(K_A,D))$. At this point, the User B examines the prefix portion of the message (X,Y) denoted by X. As will be remembered, this prefix portion contains the User A and B identities, dates, and the two counter values, $CT_{ori}$ and $CT_{rec}$. The verification process will continue only under the following conditions.

The data information is current.
User B is identified in the prefix as the recipient.
The counter value in the prefix, i.e., $CT_{rec}$ agrees with the value forwarded to User A by User B when User A requested a link and which was subsequently stored at User B's terminal.

Assuming all of these tests are met, User B then enciphers the entire message pair (X,Y) with User B's own individual key $K_B$ to form a message U, which is defined as:

$$U = \pi(K_B,(X,Y))$$

After enciphering the message U, User B transmits same to the Host together with the names A and B of the originator and recipient of the transaction.

The special purpose verify hardware resident in the CPU when supplied with the parameters A, B and U which have just been received from the User B will proceed to perform the following operations.

Utilizing the identities A and B the CPU will cause the values $K_A^*$ and $K_B^*$ to be accessed from * Table in the CPU memory. It will be remembered from the previous description that $K_A^* = \pi(K_{HV},K_A)$ and $K_B^* = \pi(K_{HV},K_B)$ from the * Table. Utilizing the $K_A^*$ and the $K_B^*$ and the known Verify Unit key, $K_{HV}$, the Verify Unit associated with the CPU will decipher the two values and determine the user keys $K_A$ and $K_B$ internally of the Verify Unit and appropriately store these in holding registers therefor, as will be explained subsequently.

The Verify Unit next deciphers the message U under its original encipherment key $K_B$ internally. This is represented by the formula $\underline{U} = \pi^{-1}(K_B,U)$. The system then treats the deciphered message $\underline{U}$ as two different parts $\underline{U}_1$ and $\underline{U}_2$ wherein $$\underline{U}_1 = \underline{U}[1,n]$$

$$\underline{U}_2 = \underline{U}[n+1,n+8]$$

In the above formulas it will be noted that $\underline{U}_1$ is the first n bytes which correspond to the data portion of the message X as originally transmitted and the portion $\underline{U}_2$ is equal to the last eight bytes of the message $\underline{U}$ which it will be remembered corresponds to the signature portion Y. At this point in time the system computes the signature of $\underline{U}_1$ utilizing the key $K_A$ and compares with the actual received signature $\underline{U}_2$. Utilizing a compare variable C, if $C=1$ it is assumed that there is a complete agreement of the signatures and if $C=0$ it is assumed that there is no such agreement.

Assuming $C=1$ the verify portion of the system will cause a signature to be derived for the logical complement of the concatenation $(\underline{U}_1,\underline{U}_2)$, this logical complement being denoted by $\sim(\underline{U}_1,\underline{U}_2)$, using the DES encryption system under chaining with the key $K_B$. The resulting verification message V will be returned to User B wherein:

$$V = S(K_B, \sim(\underline{U}_1,\underline{U}_2))$$

or if $C=0$, the verify portion of the system will cause a signature to be derived for the concatenation $(\underline{U}_1,\underline{U}_2)$ using the DES encryption system under chaining with the key $K_B$. The resulting message V will be returned to User B wherein:

$$V = S(K_B,(\underline{U}_1,\underline{U}_2))$$

At this point it should be noted that the operation of the Verify Unit is shown as performing a comparison of signatures to determine whether a successful or correct signature has been received from the User A. However, a further decision is made by the User B based on the message V returned to the User B by the CPU and the Verify Unit.

As previously stated, regardless of the result of the comparison, i.e., $C=1$ or $C=0$, the Verify Unit will derive a signature V based on $(\underline{U}_1,\underline{U}_2)$ utilizing DES and the key $K_B$. The resulting verify message V will be returned to User B. User B, using the verify message V, can now determine if the message (X,Y) from User A (presumptively equal to $(D,S(K_A,D))$) was properly signed.

Upon receipt of the message V, User B will calculate a new signature defined by the following formula:

$$V' = S(K_B, \sim(X,Y))$$

It will be noted that if everything is proper the newly calculated signature V' will equal and correspond exactly to the message V, which the CPU has returned to User B.

Thus, in summary, User B will accept the transaction if and only if the data information in X is current, the "counter" values in X agree with the stored counter values which operations were done previously upon receipt of the initial transaction from User A. The final requirement, and the most critical is the receipt of a valid verify signal from the CPU, i.e., $V = V'$.

It should be noted that in each case the signatures V and V' are the last 8 bytes of the total encryption of the indicated data contents of said signatures under the key $K_B$.

In the case of a dispute between the originator, User A and the recipient User B, User B will be required to produce the pair (X,Y) where Y is claimed to be the signature of X by User A. The arbiter will decide that the transaction is valid if and only if:

$$Y = S(K_A,X)$$

which again is the signature for the putative data message X using User A's key $K_A$.

Only one transaction with the same counter values will be declared valid on a given date. The role of the counter or time value is to protect against the re-use of a previously verified transaction; for example, User C, masquerading as User A, retransmits a previously verified (and accepted) transaction to User B. The "time stamp" imposes the protocol that no two messages will be accepted if they have identical time stamps, thus, eliminating this attempt at subversion of the transaction system.

BEST MODE FOR CARRYING OUT THE INVENTION

Having generally described the herein disclosed method for establishing a transaction protocol in accordance with the teachings of the present invention a description will follow of a best mode hardware configuration capable of performing this protocol.

Figure 4:
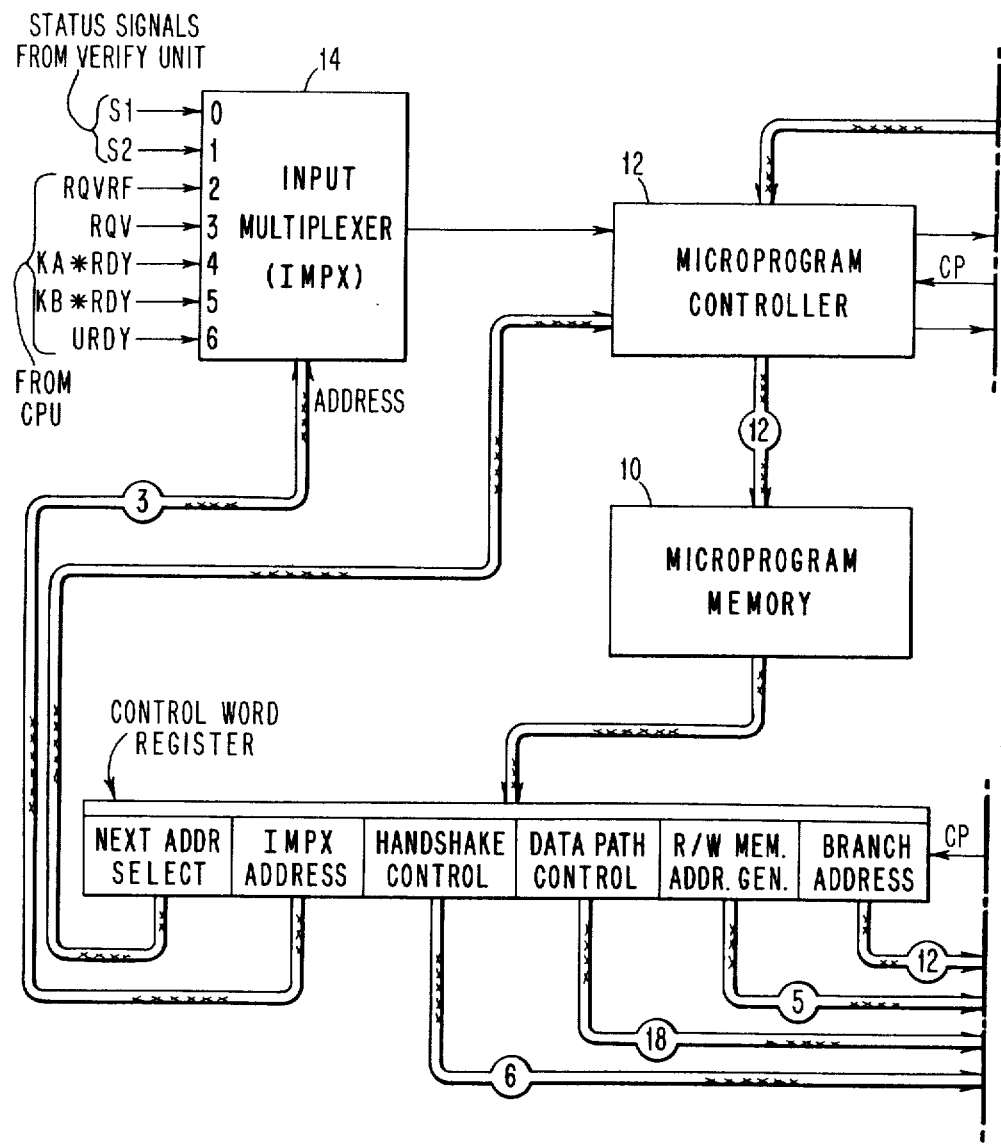
FIG. 4 comprises an organizational drawing for FIGS. 4A and 4B.
Figure 4B:
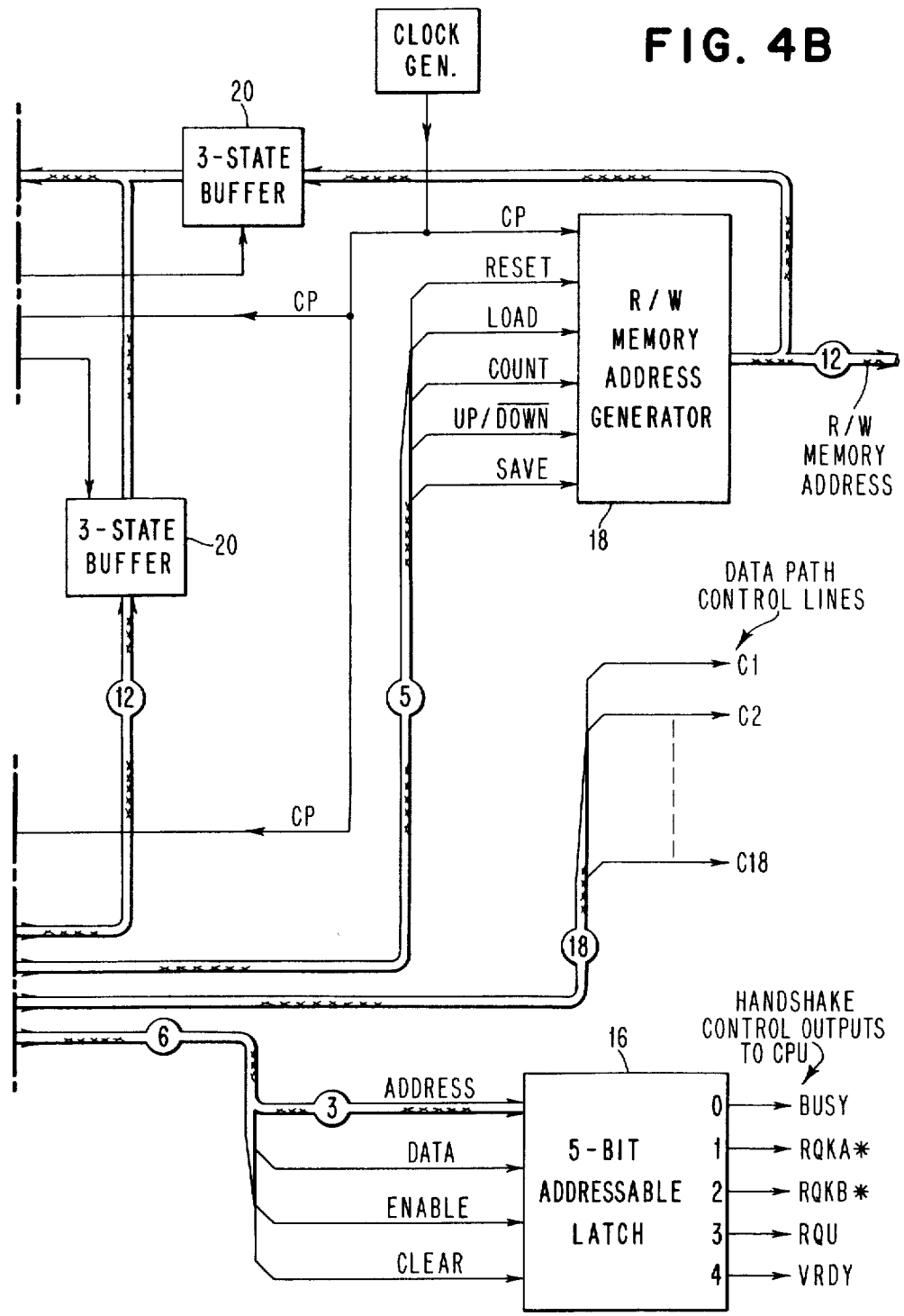

FIG. 1, as stated briefly before, comprises a broad functional block diagram of the overall system wherein a plurality of terminals are shown connected via a data communication system to a centrally located Host CPU. A Verify Unit (VAULT) is directly connected to the Host CPU and may in fact be embedded therein. It is referred to as the VAULT to indicate the very high security nature of the hardware contained therein, it being clearly understood that only the system manager with special authorization should ever have access to any of the internal information stored in said VAULT and that the security of the system is limited by the security of the personnel having access thereto. This will be well understood since the various user keys stored in the * Tables in main memory would be decipherable to anyone having access to the Verify Unit's master key $K_{HV}$ which is not accessible, it being loaded into the VAULT at the time of system initialization by the system manager. The principal functioning units of the Verify Unit will be set forth subsequently in the description of FIGS. 3A and 3B. The details of the Verify Unit Controller are shown in FIGS. 4A and 4B.

FIG. 2 shows the structure of a typical remote terminal suitable for use with the present system. The majority of the blocks of the terminal are completely conventional in nature and operate in a straightforward way. For example, the MODEM block is a modulator/demodulator well known in the art for connecting the terminal to the data bus. The CRT Display and Display Controller perform the obvious function of displaying information keyed into the terminal via the keyboard, accessed from the system memory, or received from the CPU. The keyboard is a conventional unit for entering alphanumeric data and for purposes of the present invention it should be understood that the user keys $K_A$ or $K_B$ could either be entered via the keyboard or could be stored in the System Memory uniquely accessible via a special code enterable at the keyboard by a particular user. Thus, a number of different users having different user keys $K_X$ could utilize a single terminal in accordance with the teachings of the present invention it being understood that their particular keys would either have to be entered at the keyboard or suitably accessed from the System Memory. The unique devices required of the terminal for practicing the present invention are a Programmable Timer which would be utilized to produce the counter values $CT_{rec}$ and $CT_{ori}$ mentioned in the previous description of the present transaction verification system. The DES Module shown in the terminal is identical to that shown as the DES unit in FIGS. 3A and 3B and comprises a standard key controlled block cipher encryption box with chaining. The best known example being the previously referenced U.S. Pat. No. 4,078,152, of L. B. Tuckerman.

It will be noted that the encryption system denoted herein by the symbol ($\pi$) in the formulas of FIGS. 5A through 5G, operate in a straightforward manner when provided with an encryption key K and a data block to be encrypted. Given this data the DES block will automatically produce encrypted ($\pi$) or decrypted ($\pi^{-1}$) data in its output. The System Memory Controls are so configured that when the particular data message D is being encrypted, the last 8 bytes thereof may be automatically accessed as they comprise the unique digital signatures of the present system as described in detail previously. The block marked File Controller is a back up storage device associated with the terminal unit and would be used for example to store messages when the terminal is used as an originator, i.e., User A, or as a recipient, i.e., User B. In this case it should be clearly understood that User A and User B in the present description, refer to the originator and recipient of a particular transaction respectively.

The operation of such terminals under control of a suitable microprocessor is well known in the art and will not be gone into in greater detail since the performance of the various operations required of the terminals are extremely straightforward and well known as is the case with the Programmable Timer and also the Data Security Module.

Referring now to FIGS. 3A and 3B, the primary functional units of the Verify Unit are disclosed. The S-Register stores derived signatures generated in the Verify Unit. The contents of the S-Register may be sent to the Comparator or to the Host CPU as the case requires. The DES Unit, as stated previously with respect to the description of FIG. 2, is a key controlled block cipher encryption device with chaining of the type described previously with respect to the DES Module of FIG. 2. This unit receives three data items, namely an encryption key, the data, either to be encrypted or decrypted, and finally, an indication of whether an encryption or decryption cycle is required. Control lines C13, C14 and C15 control the loading of key data, message data, select the mode of operation and initiate the cryptographic conversion process. The Register is for the purpose of specifically storing the originator's key, either in clear ($K_A$) form or in encrypted ($K_A^*$) form. The B-Register stores the receiver's (User B) key in either clear or encrypted form.

The block entitled, Read Write Memory (RWM), essentially stores the received complete messages transmitted by the system. The $K_{HV}$ Register stores the Verify Unit's master key under which all of the user keys $K_X$ are stored in the Host CPU's master memory, in encrypted form in the previously described * Table. When these encrypted keys are sent to the Verify Unit they are decrypted utilizing the master encryption key $K_{HV}$ to access the actual keys, i.e., $K_A$ and $K_B$ in the present illustration.

The Comparator block performs the exclusive function of comparing signatures on demand and will produce a one (1) or a zero (0) on its output line, depending upon whether or not the comparison is successful.

The Verify Unit Controller shown at the bottom of FIG. 3B, as is apparent, controls the operation of the Verify Unit wherein the various signals utilized are shown on the left side of the block and the handshake output signals, both to the Host and to its own circuitry, are shown emanating from the right side of the block. No commands as such are received by the Verify Unit Controller from the outside. The only signals received by the Verify Unit Controller are two status signals (S1, S2) and five handshake signals (RQVRF, . . . ,URDY). The Verify Unit is under control of the command structure set up in the microprogram memory (FIG. 4A) and is independent of external commands thereby precluding any external attempts to modify the operating sequences of the hardware resources within the Verify Unit. The Verify Unit Controller is shown in more detailed form in FIGS. 4A and 4B.

The functional units in the Verify Unit designated as CP1 through CP18 are referred to by digital design engineers as control points. Their operational sequences are quite complex in that they may perform both a gating function and a multiplexing or demultiplexing operation depending upon whether they are gating byte serial data into the various registers or out of said registers. From a functional standpoint, however, they may be simply considered as gate circuits having the multiplexing function indicated by the bit configurations entering and emanating from each control point. Each of the control points CP1 through CP18 are indicated as being controlled by control line C1 through C18. For example, control point CP2 takes seven consecutive 8 bit bytes and places them in seven consecutive 8 bit storage registers in the functional unit denoted as the A-Register (a total of 56 bits). Similarly, the control point CP6 does just the opposite. That is, it takes 7 consecutive 8 bit bytes from the A-Register and reconverts them into a series of seven 8 bit bytes which it places serially on the CD bus. It will be noted that the two control points designated as CP5 and CP17 convert from 8 bits to 64 bits since the S-Register utilizes an 8 byte signature. It will be remembered that, by definition, the signature is the last 8 bytes of the appropriately encoded message. Also, the control point CP10 is a selective inverter. That is, depending upon whether a 1 or 0 appears on control line C10, then 8 data bits passing through same will be inverted or pass through in true form. Control point CP11 merely performs a gating function. It will be noted that the Read/Write Memory (RWM) is organized in 8 bit storage locations, accordingly the control points, CP4, CP10 and CP11 need not perform any multiplexing/demultiplexing functions as described previously.

The details of the Control Point Units are not specifically shown as they would be obvious to a digital design engineer and moreover, could take a number of different design forms and still perform the required function.

The following table clearly indicates the specific functions performed by each of the Control Point Units.

VERIFY UNIT CONTROL POINT FUNCTIONAL DEFINITION TABLE

| Control Signal | Functional Unit Controlled | Operation Controlled |
|---|---|---|
| C1 | CP1 | INPUT BUS · HOST CPU DATA |
| C2 | CP2 | A-REG · INPUT BUS DATA |
| C3 | CP3 | B-REG · INPUT BUS DATA |
| C4 | CP4 | RWM · INPUT BUS DATA |
| C5 | CP5 | S-REG · INPUT BUS DATA |
| C6 | CP6 | C-D BUS · A-REG DATA |
| C7 | CP7 | CLEAR A-, B-REGS TO ZERO |
| C8 | CP8 | C-D BUS · B-REG DATA |
| C9 | CP9 | READ/WRITE MODE AND ENABLE CONTROL |
| C10 | CP10 | PASS/INVERT RWM OUTPUT DATA |
| C11 | CP11 | C-D BUS · RWM DATA |
| C12 | CP12 | C-D BUS · $K_{III}$ REG DATA |
| C13 | DES | LOAD DES KEY BUFFER FROM C-D BUS |
| C14 | DES | LOAD DES DATA BUFFER FROM C-D BUS |
| C15 | DES | CONVERT DATA (CRYPTOGRAPHIC PROCESSING)-SELECT MODE - INITIATE OPERATION |
| C16 | CP16 | INPUT BUS · DES OUTPUT DATA |
| C17 | CP17 | OUTPUT BUS · S-REGISTER DATA COMPARATOR · S-REGISTER DATA |
| C18 | CP18 | HOST CPU · OUTPUT BUS DATA |

Referring now to FIGS. 4A and 4B the details of the hardware configuration of the Verify Unit Controller are shown. The controller follows the well known architecture of a small microprogrammed controller, such as is well known in the art. Part of the controller is of course the Micro Program Memory wherein the various operational sequences are stored. Particular addresses in the Micro Program Memory selected for particular operations are determined, as will be well understood, by the Micro Program Controller 12. As a given sequence is running the next address to the Micro Program Memory 10 comes from an internal microprogram counter which is incremented unless a branch to another location in the microprogram memory is required whereupon the branch address is loaded into the microprogram controller from the branch address field of the control word register. The various conditions which control operation of the Micro Program Controller are received from the Input Multiplexer wherein the various status and/or handshaking control signals will allow a particular sequence to proceed or be terminated. The particular line of the Input Multiplexor 14 utilized for controlling a given sequence is selected by the 3 bit IMPX Address field in the Control Word Register which is connected to the IMPX 14 address input port.

The following Host CPU/Verify Unit Handshake Control Definition Table is included for convenience of reference.

HOST CPU/VERIFY UNIT INTERFACE DEFINITION TABLE

| Handshake Signal | Function |
|---|---|
| RQVRF | Inform VU of request for verification |
| RQV | Inform VU of request for derived signature V |
| KA*RDY | Inform VU that KA* data are ready for transfer |
| KB*RDY | Inform VU that KB* data are ready for transfer |
| URDY | Inform VU that U data are ready for |

HOST CPU/VERIFY UNIT INTERFACE DEFINITION TABLE -continued

| Handshake Signal | Function |
|---|---|
| | transfer |
| BUSY | A flag indicating Verify Unit status |
| RQKA* | Inform CPU of request for KA* data |
| RQKB* | Inform CPU of request for KB* data |
| RQU | Inform CPU of request for U data |
| VRDY | Inform CPU derived signature V is ready for transfer |

The Control Word Register clearly indicates the format of the instructions stored in Micro Program Memory and utilized by the system. The six specified fields are believed to be self-explanatory. The next address select, IMPX address, and branch address have just been described. The handshake control field comprises six bits, three of which address the five bit addressable latch 16. The 3 bit address lines selects an output line; "data" line is supplied with a binary value (0 or 1) that is desired at the selected output line; the "enable" line causes the binary value on the "data line" to be "latched" and thereby appear on the selected output line. The "clear" line clears all output lines to zero. For example, if you wish to set "RQU" to 1 (as in block 10 of Verify Unit Flow Chart). RQU is associated with output line 3 of the 5-bit addressable latch. The 3 "address" lines are set to "011" (binary 3), the "data" line is set to 1, and the "enable" line is set to 1 (momentarily) thereby causing output line 3 to take on the binary value of 1. Thus, RQU=1, informing the Host CPU of a request for U data.

The Data Path control field of the Control Word Register controls the various Control Point Units described previously. These signals are used to either control the data flow paths between the various registers or to control the operation of functional units such as the RWM and the DES unit of the Verify Unit as will be well understood. It will be noted on FIG. 3 that 18 Data Paths Control Lines are indicated. This is in essence a functional number of the Control Point Units requiring a plurality of inputs. Finally, the R/W Memory Address Generation field, has a five bit field which controls the R/W Memory Address Generator block 18. This block actually contains two functional units, a twelve bit bidirectional counter and a storage register for saving desired counter settings or addresses. The counter supplies an ascending sequence of memory addresses to the RWM unit to enable it to store the remaining string of message bytes making up a particular message which are received by the Verify Unit. The upper input to the generator 18, from the clock generator, produces a pulse each time a data byte is received by the system. The five bits coming from R/W Memory Address generation field of the Control Word Register perform selectively the following functions.

The "reset" line causes the counter to be reset to all zeros. The "load" line causes the current contents of the storage register mentioned previously to be loaded into the counter. The "count" line is essentially an enable line which allows the clock pulses to increment or decrement the counter as determined by the "up/down" line which controls whether, depending on the given operational sequence the counter is being incremented or decremented respectively. When the save line is actuated it causes the contents of the counter to be stored into the register. It will be noted that the 12 bit output R/W Memory Address cable emanating from the generator 18 comes directly from the counter stages. It is these consecutive addresses which cause a given message to be stored in consecutive storage locations in the R/W Memory shown in FIG. 3B of the Verify Unit. The two units designated 3 state buffers 20 are in effect gate circuits which will selectively gate to the Micro Program Controller either the data on the 12 bit cable emanating from the branch address field of the Control Word Register or from the R/W Memory Address Generator 18.

This essentially completes the general description of the presently disclosed transaction verification system. It should be noted that the various operations required of the Host CPU would conventionally be performed by straightforward programming means. The functions required of the CPU are essentially those of setting up communication paths between the user A and user B, requesting service from the resident Verify Unit and for providing requested entries from the * Table to the Verify Unit.

Reference to the Operational Sequence Charts for the Verify Unit together with the following description of the overall flow chart of FIGS. 5A through 5G will clearly explain the detailed operation of the present system. It should be understood that the User A and the User B flow charts are both present in any given terminal, however, depending upon whether a given user is an originator or a recipient, the "originating" or "receiving" operational sequence will be activated.

In the flow chart of FIGS. 5A through 5G, it will be noted that there are a number of dashed lines terminating in an arrow implying a direction of communication between the various operational sequences comprising the present transaction verification system. Each of these arrows in effect represents a handshaking operation which is required of the present system, wherein control passes from one operational sequence to the other as the need arises. These handshaking operations take place between the CPU and the Verify Unit Controller and utilize the handshaking control signal lines for that purpose. The occurrence of the handshaking operations is clearly apparent in the operational sequence charts.

Referring now to the system flow diagram which describes a complete Transaction Verification Operation, reference will first be made to FIG. 5, which is an organizational diagram for FIGS. 5A through 5G. By arranging the figures in this fashion a single flow chart for the operation of the entire system is shown. Referring to the flow chart, each of the operational sequences is clearly labeled as occurring within the terminal of User A or User B, the Host CPU, or the Verify Unit. It should be noted that on FIG. 5B there are six blocks which are the terminal portion of the User B operational sequence. This is specifically labeled on FIG. 5G.

Before proceeding with the specific description of the flow chart, the following is a Definition of Terms Table setting forth the formulas and their definitions as used in the flow chart and in the prior general description of the overall operational protocol of the system. It is believed that reference to this table of definitions will greatly facilitate an understanding of the following description of the flow chart.

| | DEFINITION OF TERMS TABLE |
|---|---|
| 1. | M: message (i.e., Busy 50 shares RDQ common . . .) |
| 2. | D:data: (A, B, date, $CT_{orig}$, $CT_{rec}$, M) |
| 3. | $S(K_1, D)$: Signature of data D: $S(K_1, D)$: last eight bytes of the chained encipherment of D by DES using the key $K_1$. |
| 4. | (X,Y): the message received from User A, presumptively equal to $(D, S(K_1, D))$. |
| 5. | CT: a current counter value at a particular terminal (orig/rec) |
| 6. | $K_A$: User A's key - $K_B$: User B's key |
| 7. | $K_{HV}$: Verify Unit's master key |
| 8. | $K_Z^*$: $\pi(K_{HV}, K_Z)$, i.e., for any user Z |
| 9. | $\pi/\pi^{-1}$: encryption/decryption under an encryption key |
| 10. | $U = \pi(K_B, (X, Y))$ |
| 11. | $U = \pi^{-1}(K_B, U) = (U_1, U_2)$ |
| 12. | $\overline{U}_1 = U[1, n]: \cdot U_2 = \overline{U}[n + 1, n + 8]$ |
| 13. | $\overline{V} = S(\overline{K}_B, U$ or $\overline{S}(K_B, \sim U) =$ last eight bytes of the chained encipherment of U by DES using the key $K_B$ |
| 14. | If $S(K_B, \sim U) = S(K_B \sim (X, Y))$ then signature of A is valid for message X. |

Referring now to the flow chart it will first be noted that the successive blocks in each of the separate sequences are numbered consecutively for ease of reference.

In may be assumed, beginning in FIG. 5A that User A wishes to initiate a transaction utilizing the present transaction verification system. User A's terminal begins operation as indicated in block 1 and a determination is made as to whether a transaction is being initiated. If not the system proceeds to block 2 where a test is made as to whether a transaction request has been received, if so the operation sequence would branch downwardly into the "receiver" mode. It will be noted, as indicated in the figure, that the operational procedure would be the same from this point on, as is shown for User B. Thus, the "originator"/"receiver" modes are both present in every terminal although only one would be operative during any given transaction.

If the answer to the test made in block 2 is "no" the system would branch back to the beginning and continue cycling through blocks 1 and 2 in a "wait" state until either User A decides to initiate a transaction or receives a transaction request from another user which will cause the operational sequence to proceed in the appropriate manner. Assuming at this point that User A is the initiator of a transaction the system proceeds to block 3 and a link is established via the Data Communication Network with User B's terminal and control switches to block 1 of User B. As will be apparent a branch to block 2 will then occur when it is determined that a transaction request has been received from User A. At this point the User B sequence proceeds to block 3 which, in fact, establishes a link to User A over the Data Communication Network. At this point User B sends his current counter value $CT_{rec}$, and at the same time causes the data: "indentity of A and $CT_{rec}$" to be saved in his local memory for subsequent comparison purposes and at this point control is transferred back to User A. At this same time it is determined whether or not the counter value from User B has been received ($CT_{rec}$).

Next, User A's sequence proceeds to block 5 which causes A's signature to be generated. The formula for this signature is set forth clearly in line 3 of the Definition of Terms Table (Definition Table). The sequence proceeds then to block 6 wherein each transaction message for transmission to User B is constructed which comprises the message pair (X,Y) the specific contents of which are clearly shown and defined in lines 2, 3, 4, 5 and 6 of the Definition Table. At this point, control transfers to the User B sequence, Block 4.

The receipt of the complete transaction message from User A causes the system to proceed to blocks 5, 6 and 8 wherein three straightforward data content tests are made, i.e., for the date, the correct addressee, i.e., User B and the proper counter value which it will be remembered was saved by User B in block 3. If any of these tests are negative the transaction will immediately abort or terminate as shown in block 7 and the sequence will proceed no further. If everything is correct however, the system proceeds to block 9 wherein the user key $K_B$ is provided to User B's DES Module which is a key-controlled block cipher cryptographic unit as described previously and similarly the message pair (X,Y) is made available to the encryption unit as the data to be encrypted, and the entire message pair (X,Y) is encrypted under User B's key to produce the message U, which is defined in line 10 of the Definition Table. The system then proceeds to block 10 wherein User B transmits to the Host CPU the message A, B, U. The portion of the message defined as A, B defines the originator and recipient of the message which is being sent to the CPU for verification. As will be remembered the data A and B provide entries to the * Table where the keys $K_A^*$ and $K_B^*$ are stored.

At this point control transfers over to the Host CPU sequence. It will first be assumed that in the start operation, the system is initialized and all handshake lines to the Verify Unit are effectively cleared to zero. In block 1 the "request for verification" signal is received from User B. The sequence proceeds to block 2 wherein the message A, B, U, is received and appropriately stored in the CPU memory.

In block 3 a test is made of the "busy" status of Verify Unit and if "busy" the system will wait until it is not busy and can proceed to block 4 wherein a request for a new transaction verification operation (RQVRF) is sent to the Verify Unit. Control then transfers the Verify Unit, specifically, block 2. It will be assumed that the start block causes the requisite handshake control output lines to be appropriately set to zero. Upon the receipt of a "request verification" signal the system proceeds to block 3 in the Verify Unit sequence wherein the "busy" flag at the Verify Unit handshake control outputs is set to a "1" which will advise the CPU that the Vertify Unit is "busy" in case it should attempt to request a further transaction verification operation.

The system then proceeds to block 4 wherein a request is made for $K_A^*$. This request goes back to the Host CPU where it will be remembered the various user keys are encrypted under the system master key $K_{HV}$ in the * Table. This request will cause the RQKA* handshake control output line from the Verify Unit to be set to a one. At this point control is shifted back to the Host CPU and specifically block 5 thereof. In block 5 the request for $K_A^*$ is acknowledged and the system proceeds to block 6 of the Host CPU sequence. In this block, the previously received value A, identifying the originator of the transaction, is used as an address into the * Table and the data referred to as $K_A^*$ is accessed and KA* RDY handshake line proceeding to the Verify Unit input handshake control is set to a one, indicating to the Verify Unit, that the $K_A^*$ data is ready. In block 7 the $K_A^*$ data is transmitted to the Verify Unit and the KA* RDY handshake line is reset to a zero. At this point control transfers back to block 5 of the Verify Unit sequence.

Block 5 acknowledges the signal, which causes $K_A^*$ to be read into the A register of the Verify Unit and at this point the RQKA* handshake control output line is reset to zero. Control now proceeds to block 7 wherein a request is made for the $K_B^*$ data. At this point it will be noted that blocks 7, 8 and 9 of the Verify Unit are essentially identical functionally to blocks 4, 5 and 6 of the Verify Unit with the exception that at the end of this sequence the data $K_B^*$ is now loaded in the B register of the Verify Unit. Similarly, blocks 8, 9 and 10 in the Host CPU sequence are essentially identical to blocks 5, 6 and 7 thereof with the exception that in this case the data $K_B^*$ is extracted from the * Table and sent to the Verify Unit. Assuming now that the data $K_B^*$ is resident in the B register, the system will proceed to block 10 of the Verify Unit sequence wherein a request is made for the data U which has been stored in the Host CPU memory. At the same time the handshake control RQU is set to a "1" in the output from the Verify Unit and control transfers back to block 11 of the Host CPU which receives the request. The Verify Unit waits until the CPU is ready to send U. When the CPU is ready, it then sets URDY line to 1. In the meanwhile the Verify Unit is waiting and monitoring the URDY line. It is assumed here that U is available and accordingly the handshake control indicated as URDY is set to a one which informs the Verify Unit that the message segment U is available for transmission.

In block 13 of the Host CPU sequence, the message segment U is sent to the Verify Unit and the URDY handshake input line to the Verify Unit is reset to a "zero". Referring now to block 12 of the Verify Unit the message segment U is read from the Host CPU and stored in the RWM of the Verify Unit and the handshake control output line RQU is reset to a "zero". Block 13 of the Verify Unit causes the originator key $K_A$ to be deciphered from the value $K_A^*$ currently stored in the A register by transmitting $K_A^*$ plus the system master key $K_{HV}$ to the DES Unit whereby User A's encryption key $K_A$ is decrypted and stored in the A register for further verification operations. The system then proceeds to block 14 where precisely the same operation is performed for the value $K_B^*$ to produce the User B's key, $K_B$, which is stored in the B register.

At this point the Verify Unit sequence proceeds to block 15 wherein the message U is deciphered under the user key $K_B$ and the results are stored in the RWM as $\underline{U}$. The definition or specification of the data content of the deciphered message U is shown in block 15A and is indicated as $\underline{U}_1$ and $\underline{U}_2$ which are the first n bytes of the deciphered message and the last 8 bytes of the deciphered message respectively. As will be remembered from the prior definition of the signature, these last 8 bytes or $\underline{U}_2$, are presumptively equal to the signature of User A. To verify this in block 16 the Verify Unit now causes the signature of User A under key $K_A$ to be constructed at this time utilizing the value $\underline{U}_1$ as the data source for the signature. Thus, if $\underline{U}_1$ has been truly received as the original message X, set by User A to User B and then enciphered under key $K_B$ and sent to CPU, then the last 8 bytes of this encipherment as performed in block 16, should be equal to the value $\underline{U}_2$. This comparison is made in block 17 and if the comparison is successful the Verify Unit will have determined that the signature for User A is valid. After this comparison the Verify Unit sequence may either branch to blocks 18 or 19 where construction of an "invalid" or "valid" message to be transmitted back to the User B is performed. In order to insure the secrecy and integrity of the return message, rather than just sending back a simple yes or no signal, which could be easily synthesized by an interloper on the line, blocks 18 and 19 cause a complex message defined as the signature V of $\underline{U}$ or of $\sim \underline{U}$ under the key $K_B$ to be generated. Thus, depending upon whether the comparison in block 17 was or was not successful, the signature V is derived utilizing $\sim \underline{U}$, the logical complement of $\underline{U}$ or $\underline{U}$ as the data source. In block 20 the VRDY handshake line from the handshake control outputs of the Verify Unit is set to a "1" which when detected by the Host CPU activates block 14 of the Host CPU which is informed that the signature V is now ready in the Verify Unit. In block 15 of the Host CPU, V is requested by setting the handshake control input line RQV to a "1" which actuates block 20 in the Verify Unit. In block 22 of the Verify Unit and block 16 of the Host CPU the message V is sent from the Verify Unit to the CPU and in block 17 of the CPU's sequence the derived signature V is transmitted directly to User B. This terminates the Host CPU operational sequence for this particular verification request and in effect returns same to the state of block 1.

Returning breifly to the Verify Unit operational sequence, transmission of the signature V to the Host CPU ends the active role of the Verify Unit operational sequence in the overall verification procedure, it being noted that block 23 and block 24 are merely clearing and resetting operations for removing stale data from the operational registers and resetting the various handshake lines to their standby or wait condition in block 2.

Figure 5B:
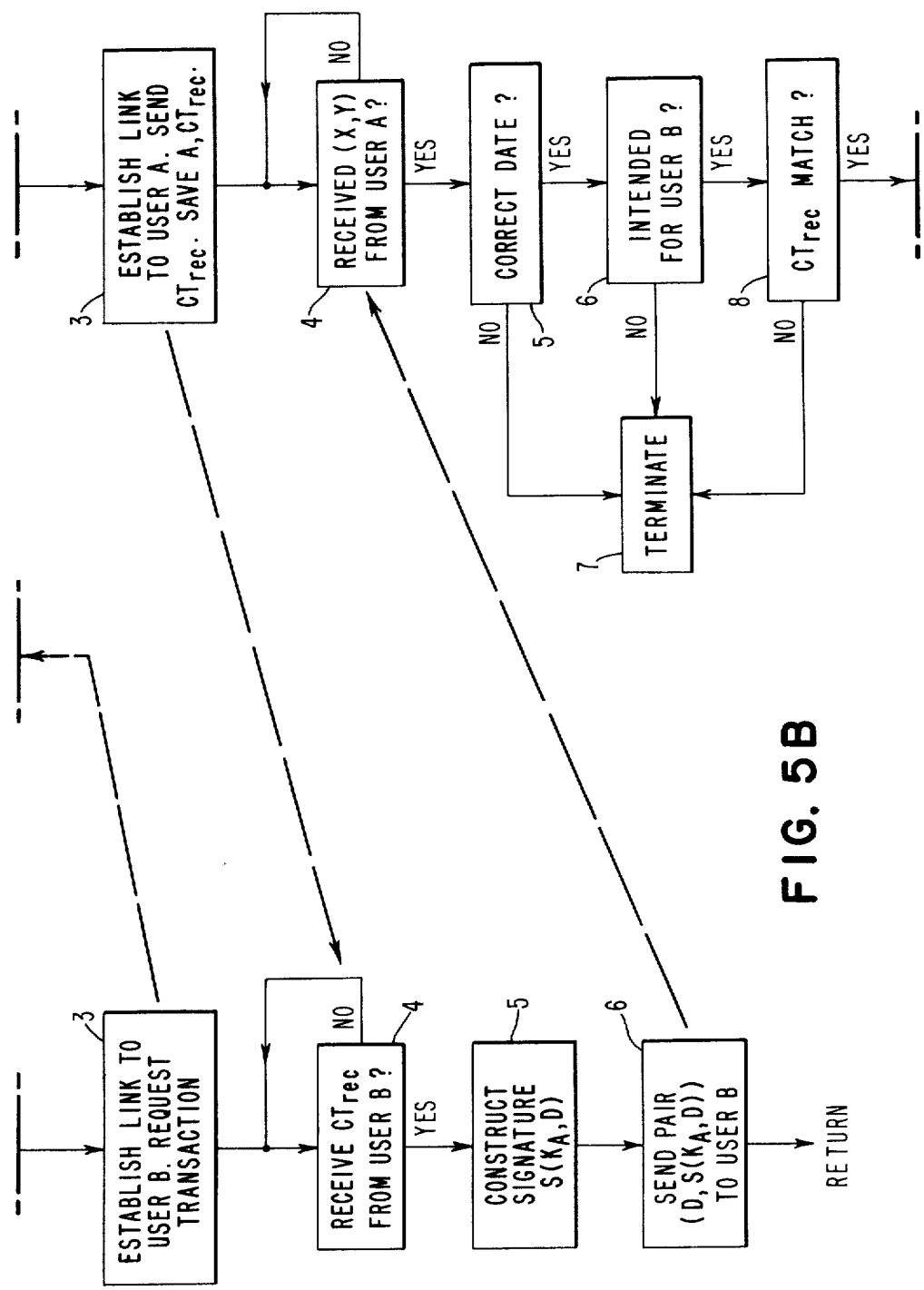
Figure 5C:
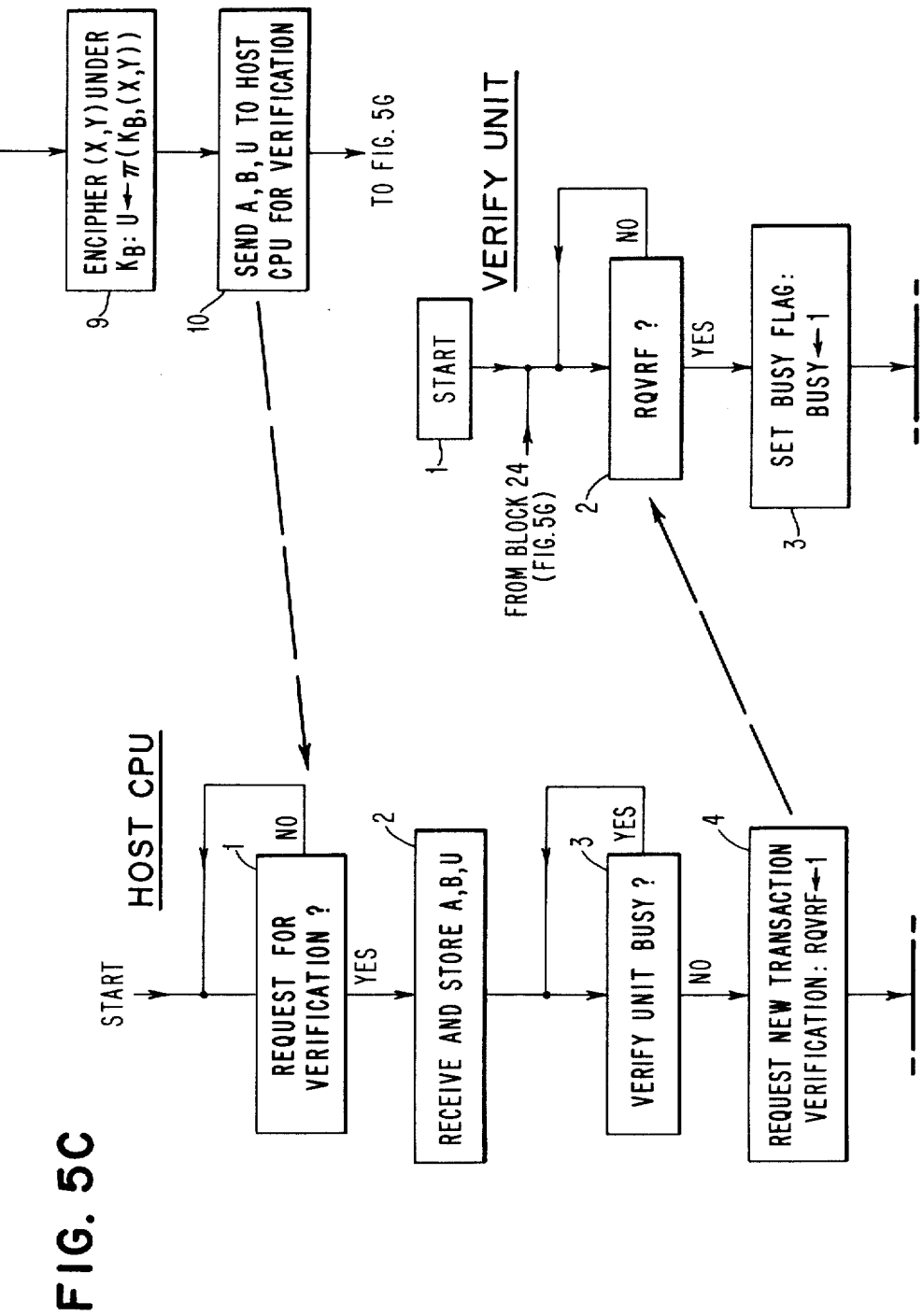
Figure 5D:
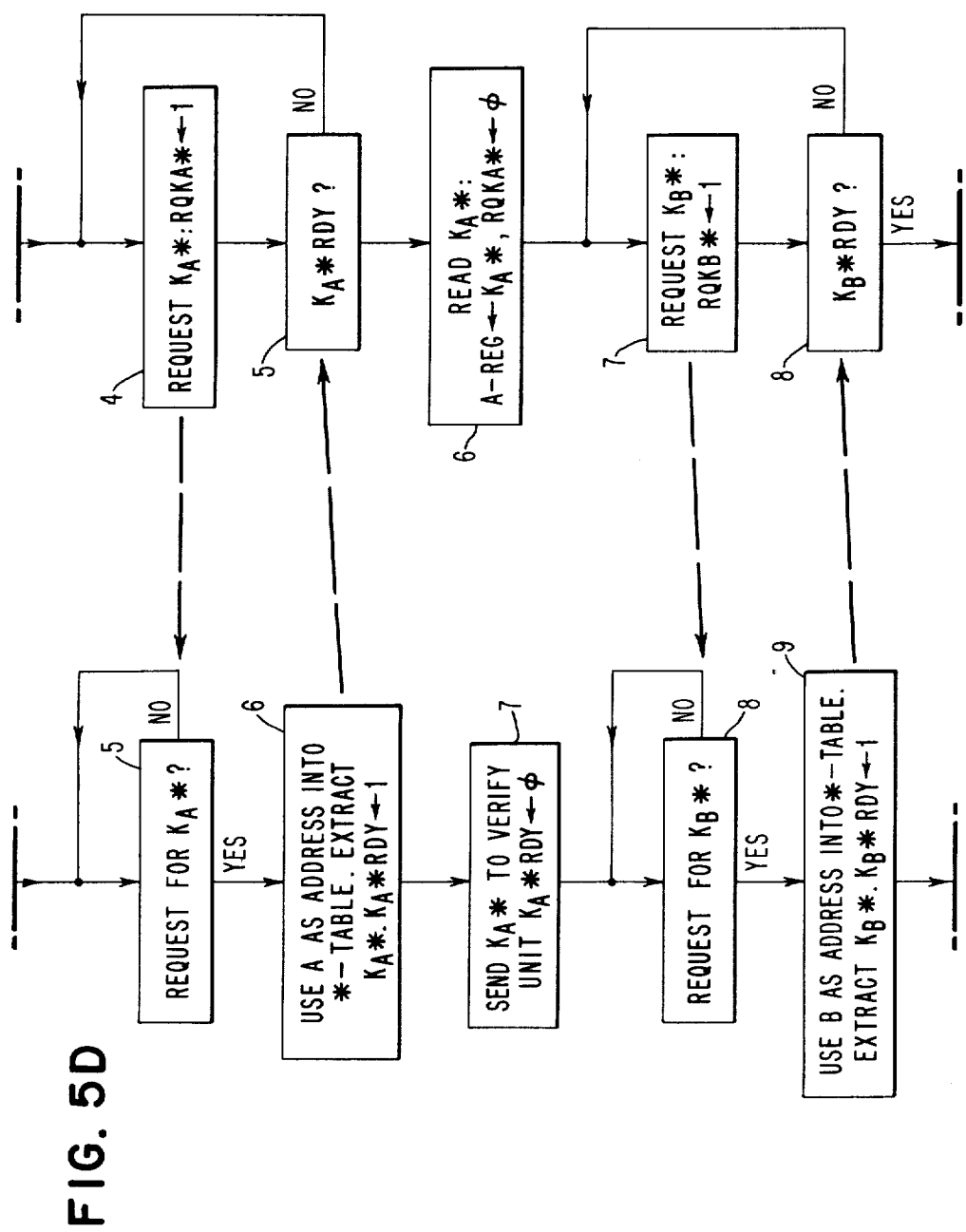
Figure 5E:
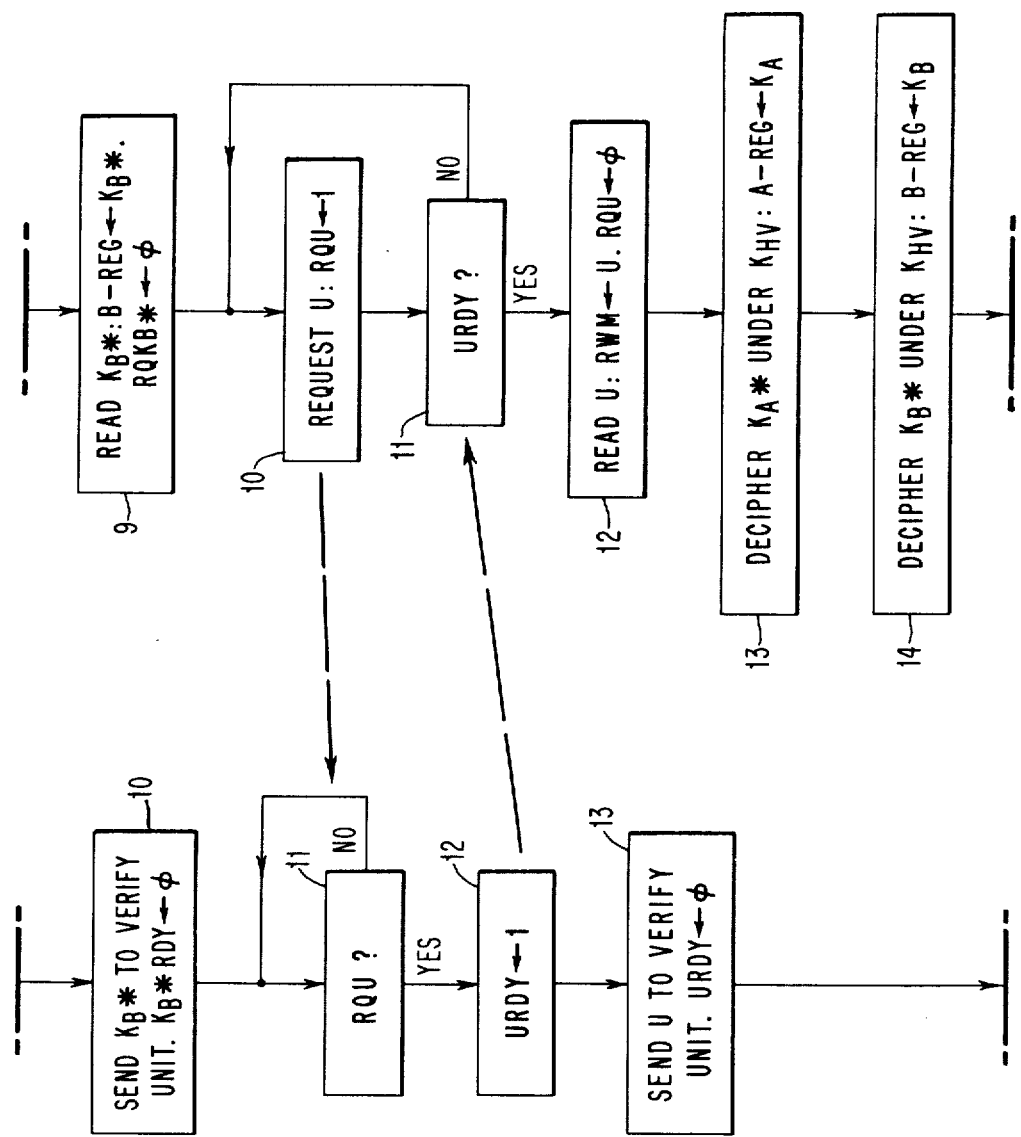
Figure 5F:
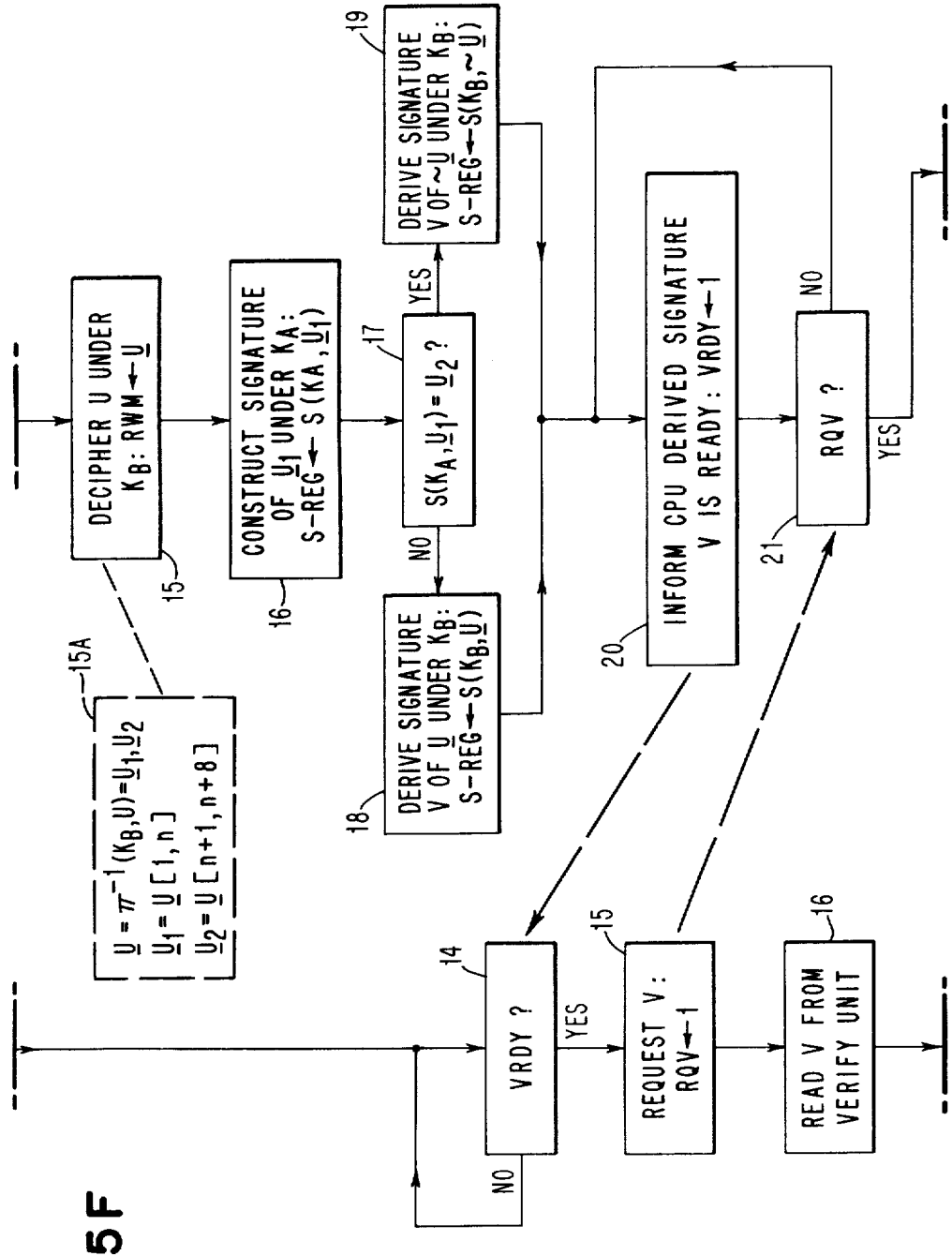
Figure 5G:
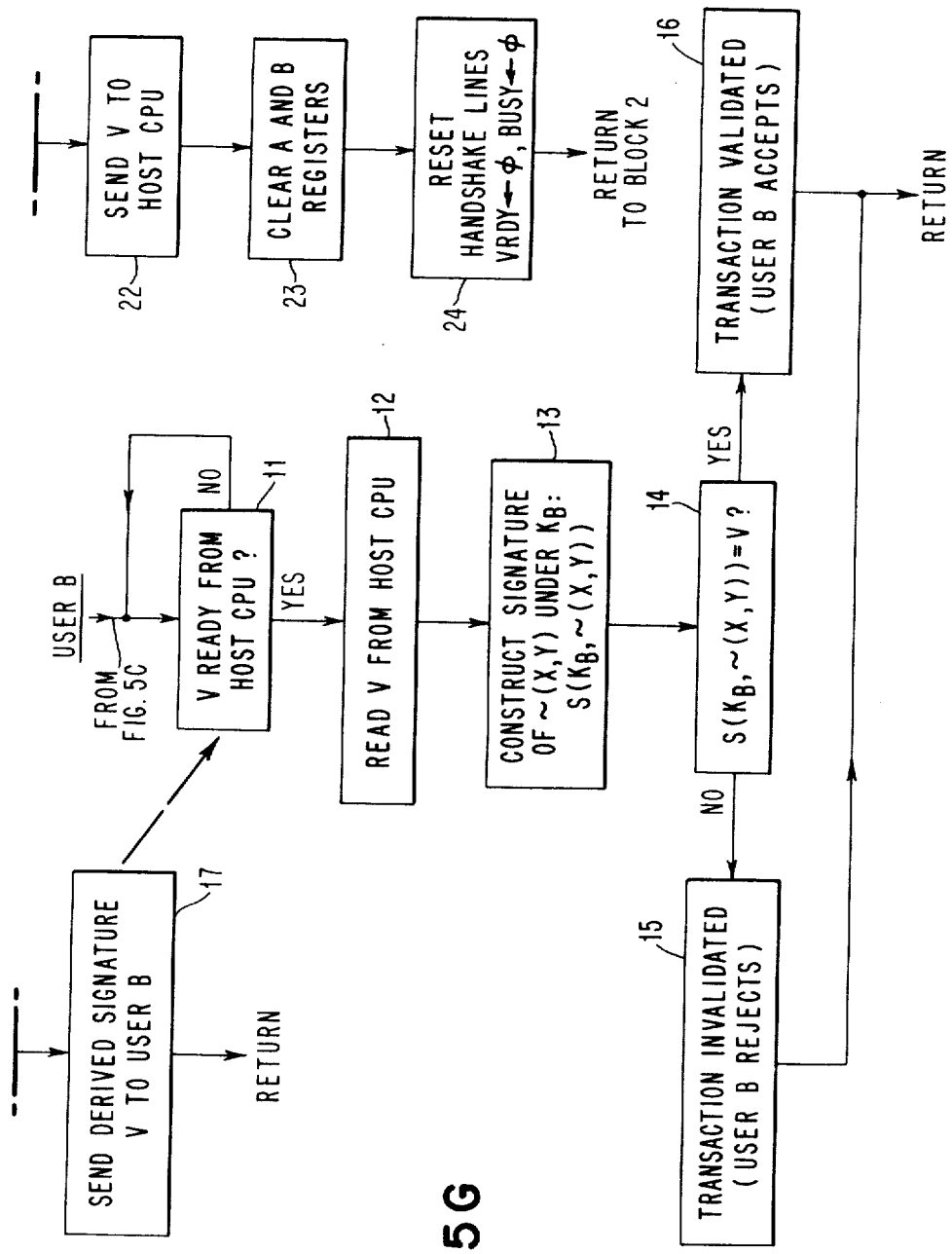

In block 11 of the User B sequence on FIG. 5G, the terminal of User B is appropriately notified that the verification message V is ready to be transmitted from the Host CPU. At this point, appropriate control is actuated and the message V is in effect read from the Host CPU in block 12 and in block 13, User B constructs the signature of the logical complement of (X,Y) denoted by $\sim(X,Y)$ under his own key $K_B$ which as will be remembered, comprises the last 8 bytes of the encryption of message $\sim(X,Y)$ under the key $K_B$. This generated signature is compared with the message V, which was received from the Host CPU in block 14 of the User B sequence. The test made in this block and its consequences are implied in line 14 of the Definition Table.

It should be noted in passing that, providing the entire system is operating properly, and no messages have been erroneously transmitted or fraudulently transmitted, then $\underline{U}$ which is the decipherment of U under the key $K_B$ should be equal to the original message (X,Y). Thus, a successful comparison in block 14 indicates that the signature Y which User B originally received from User A is correct and proper for the message portion X. It will be further noted that in addition to User B now having confidence that he has been communicating with the true User A and further that he has received a valid message X, User A is similarly protected because of the absolute dependence of his valid signature on the content of the message X. This was explained previously with respect to the arbitration procedure possible in the present system and is repeated here for purposes of emphasis only.

Having thus described the operation of the present system from the flow charts of FIGS. 5A through 5G it is believed that the overall operational characteristics will be well understood by those skilled in the art.

There will now follow a detailed exposition of the operation of the Verify Unit controls in the form of an Operational Sequence List for the Verify Unit. This list comprises a sequence of the individual operations which would conventionally be performed by micro code stored in the microprogram memory of the Verify Unit which operations must be performed to practice the herein disclosed preferred embodiment of the invention. Referring to these operational sequence lists which are numbered in accordance with the blocks of the flow chart the discrete operations carried out and the manner in which the various units of hardware shown specifically in FIGS. 3A, 3B, 4A and 4B, operate will be readily understood. A list of definitions appears at the beginning of the Operational Sequence List which defines the various acronyms or abbreviations utilized.

Operational Sequence List for Verify Unit

Definitions

| | |
|---|---|
| RWM: | Read/Write Memory |
| RWMAG: | Read/Write Memory Address Generator |
| IMPX: | Input Multiplexer |
| DES Unit: | Data Encryption Standard Unit |
| (Ci): | i-th Control Point, activation of |
| RESET: | RWMAG set to zero |
| LOAD: | Contents of internal storage register are loaded into RWMAG |
| COUNT: | Enables RWMAG to count |
| U/$\overline{D}$: | Up (1) /down (0) count-mode control for RWMAG |
| SAVE: | Contents of RWMAG are saved in internal storage register |
| CLEAR: | All handshake control output lines are cleared to zero |

| STEP | |
|---|---|
| 1 | CLEAR |
| 2 | Set IMPX ADDRESS to 2 |
| | TEST RQVRF: |
| | If 0, hold; |
| | If 1, continue |
| 3 | Set BUSY to 1 |
| 4 | Set RQKA* to 1 |
| 5 | Set IMPX ADDRESS to 4 |
| | TEST KA*RDY: |
| | If 0, hold |
| | If 1, continue |
| 6 | |
| 6.1 | Load A-Register with KA* from Host CPU. (C1,C2) |
| 6.2 | Clear RQKA* to 0 |
| 7 | Set RQKB* to 1 |
| 8 | Set IMPX ADDRESS to 5 |
| 9 | |
| 9.1 | Load B-Register with KB* from Host CPU. (C1,C2) |
| 9.2 | Clear RQKB* to 0 |
| 10 | Set RQU to 1 |
| 11 | Set IMPX ADDRESS to 6 |
| | Test URDY: |
| | If 0, hold |
| | If 1, continue |
| 12 | |
| 12.1 | RESET |
| 12.2 | Set U/$\overline{D}$ to 1 |
| 12.3 | Set RWM for write operation (C9) |
| 12.4 | Set IMPX ADDRESS to 6 |
| 12.5 | Load one data byte of U from Host CPU to RWM via Input-Bus (C1,C4) |
| 12.6 | Test URDY: |
| | If 1, increment RWMAG and go to step 12.5; |
| | If 0, continue |
| 12.7 | Clear RQU to 0 |
| 12.8 | SAVE |
| 13 | |
| 13.1 | Load key KHV into DES Unit (C12,C13) |
| 13.2 | Load data from A-Register (KA*) into DES Unit (C6,C14) |
| 13.3 | Decipher data (C15) |

-continued

Operational Sequence List for Verify Unit

| | |
|---|---|
| 13.4 | Read 7 bytes of data (KA) from DES Unit into A-Register (C16,C2) |
| 14 | |
| 14.1 | Load key KHV into DES Unit (C12,C13) |
| 14.2 | Load data from B-Register (KB*) into DES Unit (C8,C14) |
| 14.3 | Decipher data (C15) |
| 14.4 | Read 7 bytes of data (KB) from DES Unit into B-Register (C16,C3) |
| 15 | |
| 15.1 | Load N + 8 into Microprogram Controller |
| 15.2 | Load Key $K_B$ into DES Unit (C8,C13) |
| 15.3 | Set U/$\overline{D}$ to 1 |
| 15.4 | RESET |
| 15.5 | SAVE |
| 15.6 | Set RWM for read operation (C9,C10) |
| 15.7 | Load 8 bytes of U data from RWM into DES Unit (C11,C14) |
| 15.8 | Decipher data (C15) |
| 15.9 | LOAD |
| 15.10 | Set RWM for write operation (C4, C9) |
| 15.11 | Store 8 bytes of U data from DES Unit in RWM (C16,C4) |

Repeat steps 15.5 through 15.11 as necessary until N + 8 bytes of U data have been processed.

| | |
|---|---|
| 16 | |
| 16.1 | Decrement RWMAG by 8 (RWMAG ← N) |
| 16.2 | SAVE |
| 16.3 | Load N into Microprogram Controller |
| 16.4 | RESET |
| 16.5 | Set U/$\overline{D}$ to 1 |
| 16.6 | Load Key KA into DES Unit (C6,C13) |
| 16.7 | Set RWM for non-inverting read operation (C9,C10) |
| 16.8 | Load 8 bytes of $U_1$ data from RWM into DES Unit (C11,C14) |
| 16.9 | Encipher data (C15) |

Steps 16.8 and 16.9 are repeated as necessary until a total of N bytes of data ($U_1$) have been processed from RWM. (A short block, if one occurs, and chaining linkages are handled internally by the DES Unit).

| | |
|---|---|
| 16.10 | Read final 8 bytes of data from the DES Unit into the S-Register (C16,C5) [S-REGISTER ← S(KA,$\underline{U}$)] |
| 17 | |
| 17.1 | LOAD (RWMAG ← N) |
| 17.2 | Set U/$\overline{D}$ to 1 |
| 17.3 | Set RWM for non-inverting read operation (C9,C14) |
| 17.4 | Set IMPX ADDRESS to 1 |
| 17.5 | Increment RWMAG |
| 17.6 | Read data byte from RWM to comparator Q input (C11) |
| 17.7 | Read data byte from S-Register to comparator P input (C17) |
| 17.8 | Test S2 (S2 = O), go to step 17.5 if additional bytes of S(KA,$U_1$) remain to be tested; else, go to step 19 |
| 18 | |
| 18.1 | LOAD (RWMAG ← N) |
| 18.2 | Increment RWMAG by 8 (RWMAG ← N + 8) |
| 18.3 | Load N + 8 into Microprogram Controller |
| 18.4 | RESET (RWMAG ← 0) |
| 18.5 | Load Key KB into DES Unit (C8,C13) |
| 18.6 | Set RWM for non-inverting read operation (C9,C10) |
| 18.7 | Load 8 bytes of $\underline{U}$ data from RWM into DES Unit (C11,C14) |
| 18.8 | Encipher data (C15) |

Steps 18.7 and 18.8 are repeated as necessary until N + 8 bytes of $\underline{U}$ data have been processed. (A short block, if one occurs, and chaining linkages are handled internally by the DES Unit).

| | |
|---|---|
| 18.9 | Read final 8 bytes from DES Unit into the S-Register (C16,C5) [S-REGISTER ← S(KB,$\underline{U}$)] |
| 19 | |
| 19.1 | LOAD (RWMAG ← N) |
| 19.2 | Increment RWMAG by 8 (RWMAG ← N + 8) |
| 19.3 | Load N + 8 into Microprogram Controller |

-continued

| | Operational Sequence List for Verify Unit |
|---|---|
| 19.4 | RESET |
| 19.5 | Set U/$\overline{D}$ to 1 |
| 19.6 | Load key KB into DES Unit (C8,C13) |
| 19.7 | Set RWM for inverting read operation (C9,C10) |
| 19.8 | Load 8 bytes of inverted $\underline{U}$ data from RWM into DES Unit (C11,C14) |
| 19.9 | Encipher data (C15) |
| Steps 19.8 and 19.9 are repeated as necessary until N + 8 bytes of $\underline{U}$ data have been processed. (A short block, if one occurs, and chaining linkages are handled internally by the DES Unit). | |
| 19.10 | READ FINAL 8 bytes from DES Unit into the S-Register (C16,C5) [S-REGISTER ← S(KB,~$\underline{U}$)] |
| 20 | Set VRDY to 1 |
| 21 | Set IMPX ADDRESS to 3 Test RQV: If 0, hold If 1, continue |
| 22 | Read 8 bytes of V data from S-Register to Host CPU (C17,C18) |
| 23 | Clear A- and B-Registers (C7) |
| 24 | |
| 24.1 | CLEAR (Handshake control output lines cleared to 0) |
| 24.2 | Go to step 2 |

From the above detailed Operational Sequence List for the Verify Unit, it is believed that the operation of the overall system will be clearly apparent to those skilled in the art. Specific Operational Sequence Lists were not given for the Terminal Unit or for the Host CPU since these units are essentially well known in the art. Similarly, how to program such hardware to perform the various operations set forth in the flow chart of FIGS. 5A through 5G is well known. For example, within the terminals, the various operations required could easily be controlled by hardware dedicated keyboard operations or could be done via a microprogram controller such as utilized in the Verify Unit.

Similarly, within the Host CPU, the actual operations performed are a relatively simple and straightforward list of fetches, data requests and the transmitting of messages between the User B and the Host upon command and it is believed that such functions are notoriously old per se and that, given the present flow charts, programming for such a verification routine would be extremely straightforward and would vary only with the particular Host CPU architecture, program language, etc., involved.

INDUSTRIAL APPLICABILITY

The uses of the herein disclosed transaction verification in the modern day business environment could be manifold. As has been reiterated herein, the system assures virtually a foolproof method of guaranteeing both the identity of the sender or originator of a message insofar as a receiver is concerned, while at the same time guaranteeing the integrity of the message to the original sender. This allows the utilization of long distance telecommunications facilities for the real time completion of transactions which could only be performed in the past utilizing much more time consuming and conventional methods, such as electronic mail or by actually having people meet to consummate various transactions.

Thus for example, legally binding contracts could be effected by having both parties to the contract send an additional data or message portion to the other, each having his own unique signature appended thereto, plus each party to the transaction would have his own resident copy of the contract, electronically signed by the other party and wherein the actual wording of the contract would be verifiable at any time in the future, if a conflict arose and allegations were made that the wordings were at variance.

Similarly, long distance highly verifiable purchase orders could be made between individuals where, due to the nature of the transaction, or the amount of money involved were great, the receiver of such a message would not normally act until the identity of the sender were irrevocably established.

The system could also have applicability for such a commercial purpose as telephone ordering (i.e., local terminal) by an individual from a large, centrally located store, wherein both ordering and funds transfer could be handled in a highly reliable manner utilizing various aspects of the presently disclosed system.

In short, any area where the identity of the sender and the actual content of the transmitted message must both be firmly established would be possible candidates for use of the present invention.

In summary, the present system, as disclosed, prevents masquerading by any party (not having access to the secret keys) even though he has access to eavesdropping equipment over the line. It also prevents the gathering of any useful information via eavesdropping which could be subsequently used to bypass the present security system. The only actual data which could be obtained by an eavesdropper which might or might not prove useful would be the actual message content of the unencrypted portions of the message, i.e., from User A to the Host CPU during the initialization portion of the procedure. It will be readily understood that this could be easily avoided by utilizing further cryptographic transmission security via the system hardware already present in the system. In such cases all messages would be transmitted using an overall system message transmission key ($K_T$) known to all users and the CPU but not presumptively to an eavesdropper. Such encryption would be superimposed on the message protocol described herein as will be well understood by those skilled in the art.

It should also be understood that while the present invention has been specifically set forth and described with reference to a preferred embodiment, it will be readily appreciated by those skilled in the art that many changes in form and detail may be made without departing from the spirit and scope of the present invention as set forth in the appended claims.

Having thus described my invention, what I claim as new, and desire to secure by Letters Patent is:

1. A method for effecting a high security transaction verification operation in a computer based communications system comprising a central Host CPU which includes a high security Verify Unit (VAULT) therein said system including at least two remotely located terminals selectively connectable to said Host CPU and wherein said Verify Unit and each of said terminals includes substantially identical key-controlled block cipher cryptographic devices with block chaining included therein said method comprising:

User A (originator) at a first terminal sending User B (receiver) at a second terminal a message M having a data portion (X) and a signature portion (Y) said signature portion being a block cipher function of A's key $K_A$ and the data portion (X), such that M=(X,Y);

User B on receipt of the message (X,Y) reencrypting same under his own key $K_B$ to form a message U, sending said message U to the Host CPU together with the identities of User A and User B (originator, receiver), and requesting a verification operation from said Host CPU, the Host CPU, after receiving said message, obtaining the keys $K_A$ and $K_B$ from a secure storage means and decrypting U under key $K_B$ to obtain message $\underline{U}$ which presumptively comprises a message portion $\underline{U}_1$ and a signature portion $\underline{U}_2$;

the Host CPU then forming a signature utilizing $\underline{U}_1$ as the data input and $K_A$ as the key input to the cryptographic device and comparing this signature with the signature value $\underline{U}_2$ received from User B, and the Host CPU returning an accept/reject signal to User B depending upon whether or not the two signatures are identical.

2. A method as set forth in claim 1 wherein, after determining the validity of the received signature $\underline{U}_2$ the Host CPU then generating a new signature V for the received message $\underline{U}$ which is a predetermined function of the key $K_B$ and the previously decrypted message $\underline{U}$ depending upon the result of said signature comparison operation, and sending the message V to User B;

User B on receipt of the message V computing a signature V' which is a predetermined function of his own key $K_B$ and the message (X,Y) initially received from User A and comparing same with the message V for correspondence.

3. A transaction verification method as set forth in claim 2, including said Verify Unit utilizing the data $\sim\underline{U}$ (the logical complement of $\underline{U}$) for generating the signature message V when a valid signature from User A is to be acknowledged and utilizing the data $\underline{U}$ to produce the signature V when the signature for User A is found to be incorrect, and said User B utilizing the data $\sim$(X,Y) (the logical complement of X,Y) to produce the signature message V' and comparing V' with the signature message V received from Host CPU.

4. A transaction verification method as set forth in claim 2 whereby the security of the individual user keys $K_Z$ is maintained by storing all said individual user keys in the Host CPU under a master system key $K_{HV}$ and accessing a particular encrypted key $K_Z^*$ belonging to an identified User Z from the Host CPU memory and decrypting same under said master key $K_{HV}$ in the said Verify Unit.

5. A transaction verification method as set forth in claim 4 including utilizing a master system transmission key $K_T$ for all communications between Users and between any User and the Host CPU subject to eavesdropping and wherein said transmission encryption operation is superimposed upon all messages between such system entities wherein all messages must first be encrypted under the system transmission key $K_T$ before transmission and decrypted under said transmission key $K_T$ upon receipt from another unit.

6. A method for transaction verification as set forth in claim 4 including forming all signatures in the present system by selecting as said signatures a predetermined final number of bytes of the block chained encryption of the full data input to said key controlled block-cipher cryptographic device with chaining wherein said signature is a direct function of and fully dependent upon the entire content of the data input to said cryptographic device.

7. A transaction verification method as set forth in claim 2 including the User A forming the initial message M utilizing the unique counter value from his own terminal ($CT_{orig}$) a unique counter value ($CT_{rec}$) obtained from the receiver's (User B) terminal and, the current date and utilizing this information as a header on the message (X) and said User B, upon receiving said initial message, checking the date, and the value of the counter $CT_{rec}$ for correspondence with a stored value which was previously sent User A upon the initial contact between User A and User B and aborting said transaction if either of said values fails to agree.

8. A transaction verification method for use in a computer based communication system comprising a central Host CPU which includes a high security Verify Unit therein said system including a plurality of remotely located terminals selectively connectable to each other and to said Host CPU via said communications system and wherein said Verify Unit and each of said terminals includes substantially identical key-controlled block-cipher cryptographic devices with block chaining, said method comprising User A (originator), at a first terminal sending User B (receiver) at a second terminal a message M having a data (X) portion and a signature portion (Y) said signature portion being a block-cipher function of User A's key $K_A$ and the data portion (X) such that: M=(X,Y);

User B on receipt of said message M reencrypting said entire message M under his own key $K_B$ to form a message U, sending said message U to the Host CPU together with the identities of User A and User B and requesting a verification operation from said Host CPU;

the Host CPU, upon receipt of said message from User B, requesting a verify operation from its associated Verify Unit and providing the message information U to said Verify Unit;

said Verify Unit obtaining the keys $K_A$ and $K_B$ from a secure storage means located in said Host CPU and decrypting U under key $K_B$ to obtain message $\underline{U}$ which comprises a data portion $\underline{U}_1$ and a signature portion $\underline{U}_2$, the Verify Unit then forming a signature utilizing the data portion $\underline{U}_1$ as the data input and the key $K_A$ as the key input to its associated cryptographic device and comparing the signature so generated with the signature value $\underline{U}_2$ received from User B, said Verify Unit after determining the validity of the received signature $\underline{U}_2$ then generating a new signature V for the message $\underline{U}$ which signature is a predetermined function of the key $K_B$ and the previously decrypted message $\underline{U}$ the particular function being dependent upon the result of said signature comparison operation and sending the message V to User B;

User B upon receipt of the message V computing a signature V' which is a predetermined function of his own key $K_B$ and the message (X,Y) initially received from User A and comparing same with the message V for correspondence; and wherein all signature generation operations in the previous enumerated signature generating steps comprise selecting as said signatures a predetermined final number of bytes of the block chained encryption of the full data input to said associated key-controlled block-cipher cryptographic devices with chaining wherein each said signature is a direct function of and fully dependent upon the entire data content supplied to said cryptographic device.

9. A transaction verification method as set forth in claim 8 wherein the individual User keys $K_Z$ are stored in the Host CPU system memory in encrypted form under a Verify Unit master key $K_{HV}$ and said individual keys are obtained from said Host CPU by the Verify Unit by accessing said Host at addresses derived from the identities of the Users A and B supplied to said Verify Unit, and decrypting said keys under the master key $K_{HV}$ to obtain the original User's keys $K_A$ and $K_B$.

10. A transaction verification method as set forth in claim 9 including User B supplying to User A a counter value $CT_{rec}$ when User B is first contacted for a transaction by User A, and User B concurrently storing in a local memory said counter value $CT_{rec}$, User A forming the initial message M utilizing the unique counter value from his own terminal $CT_{orig}$, the counter value $CT_{rec}$ previously obtained from User B's terminal and the current date as a header on the transaction message (X) and said User B, upon receiving said initial message M, checking the date and the value of the counter $CT_{rec}$ for correspondence with said stored value and aborting such transaction if either the date or the counter values fail to agree.

11. A computer based communications system having a high security transaction verification feature incorporated therein, said system comprising a Host CPU which includes a high security Verify Unit therein, said system further including a plurality of remotely located terminals including means for selectively connecting each terminal to said Host CPU or to another terminal via the communications network associated therewith, said Verify Unit and each of said terminals including substantially identical key-controlled block-cipher cryptographic devices equipped with a block chaining feature, each terminal including means actuable when said terminal is used as an originating device (Terminal A) in a transaction to send a message M to another terminal acting as a receiver (Terminal B) said message M having a data portion (X) and a signature portion (Y), means for actuating the cryptographic device located in said terminal to form said signature (Y) as a block-cipher function of Terminal A's key $K_A$ and the data portion (X) such that $M=(X,Y)$;

means in the receiving terminal (Terminal B) actuable on receipt of the message M from (Terminal A) for reencrypting said message under the terminal's own key $K_B$ to form a message U and means for sending said message U to the Host CPU together with the identities of the originating and receiving terminals (Terminal A and Terminal B) and means for requesting a verification operation from said Host CPU;

means in said Host CPU actuable upon the receipt of said message for obtaining the keys $K_A$ and $K_B$ from memory and for requesting a verify operation from the Verify Unit associated therewith;

means in said Verify Unit for decrypting the message U under terminal B's key $K_B$ to obtain a decrypted message $\underline{U}$ which comprises a message portion $\underline{U}_1$ and a signature portion $\underline{U}_2$, means in said Verify Unit for forming a signature utilizing $\underline{U}_1$ as a data input and the originating terminal's key $K_A$ as the key input to the cryptographic device contained therein and means for comparing the signature so generated with the signature value $\underline{U}_2$ received from terminal B;

means in said Verify Unit for returning an accept/reject signal to receiving terminal B depending upon whether the two signatures are identical.

12. A communication system as set forth in claim 11 wherein said means in said Verify Unit for returning an accept/reject signal to the receiving terminal B comprises means for generating a signature V including means for supplying the decrypted data message $\underline{U}$, previously received from terminal B as the data input to the cryptographic device in the Verify Unit, and for supplying the key $K_B$ as the key input to said cryptographic device and means for transmitting said derived signature V to the terminal B;

means in said terminal actuable on receipt of the signature V to generate a signature V' using the logical complement of the original message M as the data input to said terminal's cryptographic device and the terminal B's key $K_B$ as the key input to said device and means for comparing the generated signature V' with the signature V received from the Verify Unit.

13. A communication system as set forth in claim 12 wherein said means for generating the signature V within the Verify Unit comprises means actuable in response to the comparison between the signatures $\underline{U}_2$ and that generated from $\underline{U}_1$ and $K_A$ to supply the logical complement of $\underline{U}$ to the encryption device in the Verify Unit upon a successful comparison and for supplying the true value of $\underline{U}$ to said encryption device if said comparison is unsuccessful.

14. A communication system as set forth in claim 13 including key storage means in the Host CPU for storing all of the individual user keys $K_Z$ in system memory in encrypted form under a master storage key $K_{HV}$ which is resident in a high security storage means within the Verify Unit;

means for generating key storage addresses based on the identity of the particular terminals involved in a given transaction and for transmitting accessed, encrypted keys $K_Z$ to the Verify Unit and means operative therein to decrypt said keys to obtain the actual keys for use in the transaction verification operations.

15. A communication system as set forth in claim 14 including transmission encryption means resident in all terminals of said system and in the Host CPU for encrypting all messages transmitted between terminals and between a terminal and the Host CPU under a master transmission key $K_T$ and means for decrypting all received messages under said same encryption key $K_T$.

16. A communication system as set forth in claim 14 including means associated with the cryptographic device in said terminals and said Host CPU for forming all signatures utilized within the system by selecting a predetermined final number of bytes of the encrypted output of said cryptographic devices said output being derived from the entire data message input to said cryptographic device whereby said signatures are dependent upon the entire data message being encrypted.

17. A communication system as set forth in claim 12 including counter means resident in each terminal for producing a time dependent count value and means for including a predetermined current count value of the counters in both the originating and receiving terminals as a part of a message header which is incorporated in the data portion (X) of the message M transmitted from the originating terminal A to the receiving terminal B, means resident in each terminal for placing a quantity indicative of the date of a particular transaction as a portion of the header in any message M transmitted to another terminal, and means within each terminal for verifying the proper relationship of the count values and date for any received message wherein a transaction verification is to be requested.

* * * * *

UNITED STATES PATENT AND TRADEMARK OFFICE
CERTIFICATE OF CORRECTION

PATENT NO. : 4,264,782
DATED : April 28, 1981
INVENTOR(S) : Alan G. Konheim

It is certified that error appears in the above-identified patent and that said Letters Patent is hereby corrected as shown below:

Column 5, line 7, "Feb. 2, 1977;" should read -- Feb. 28, 1977;--

*Signed and Sealed this*

*Twenty-fifth* Day of *June 1985*

[SEAL]

Attest:

DONALD J. QUIGG

*Attesting Officer*   *Acting Commissioner of Patents and Trademarks*